INVENTORS
SAMUEL D. HARRIS
JAMES H. DOWNING
BY Towson Price
ATTORNEY

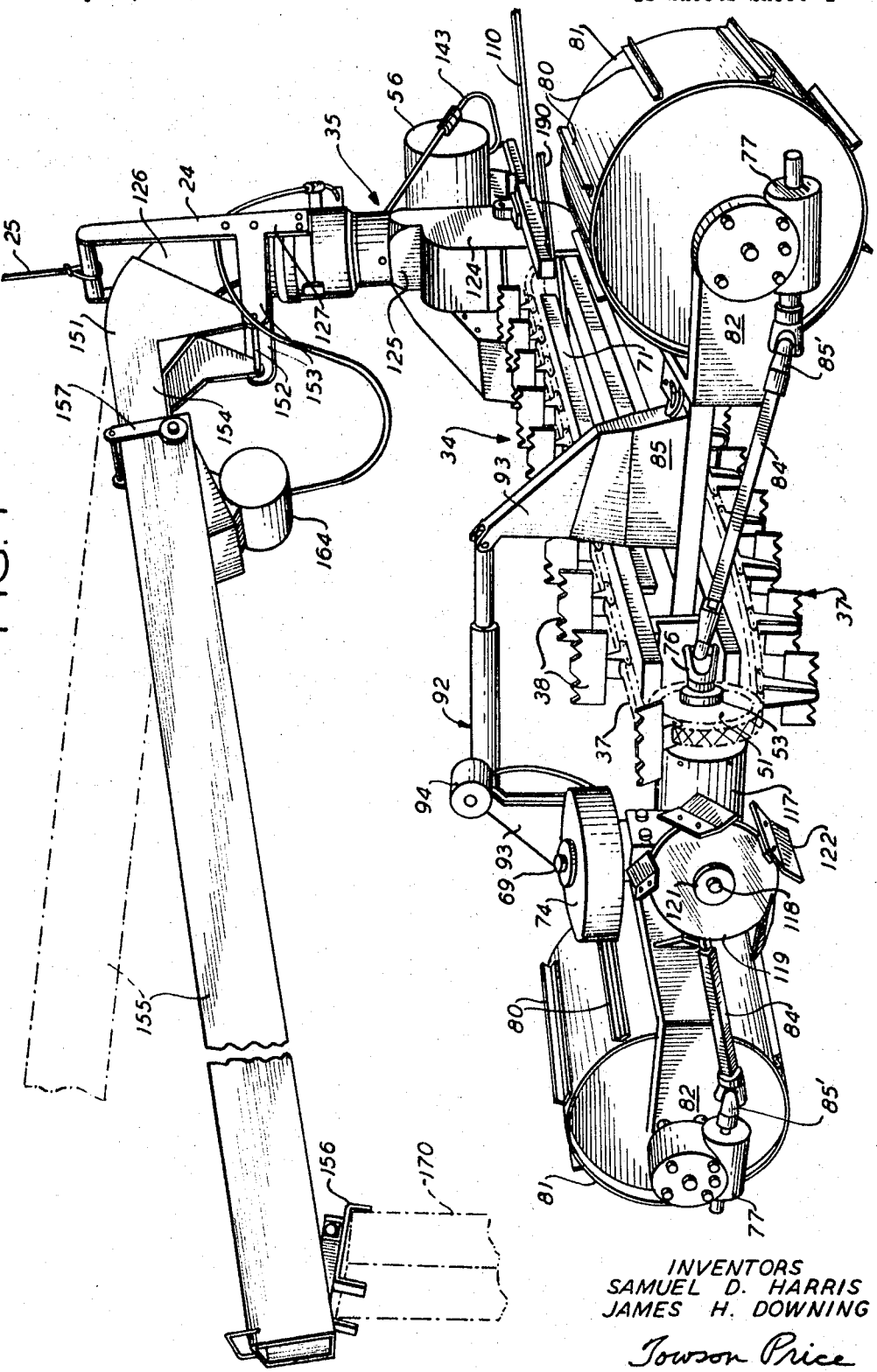
FIG. I
INVENTORS
SAMUEL D. HARRIS
JAMES H. DOWNING
BY *Towson Price*
ATTORNEY

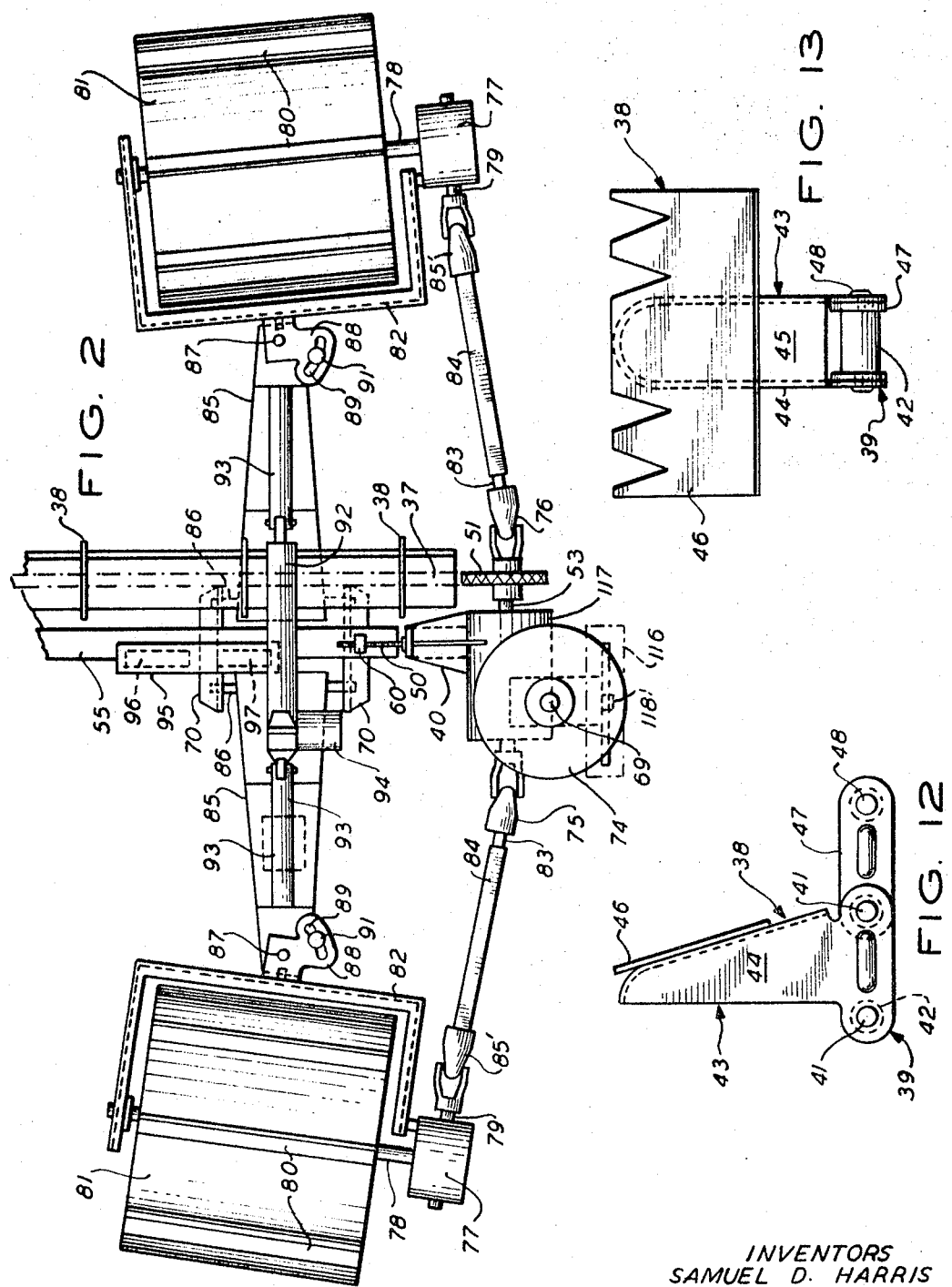

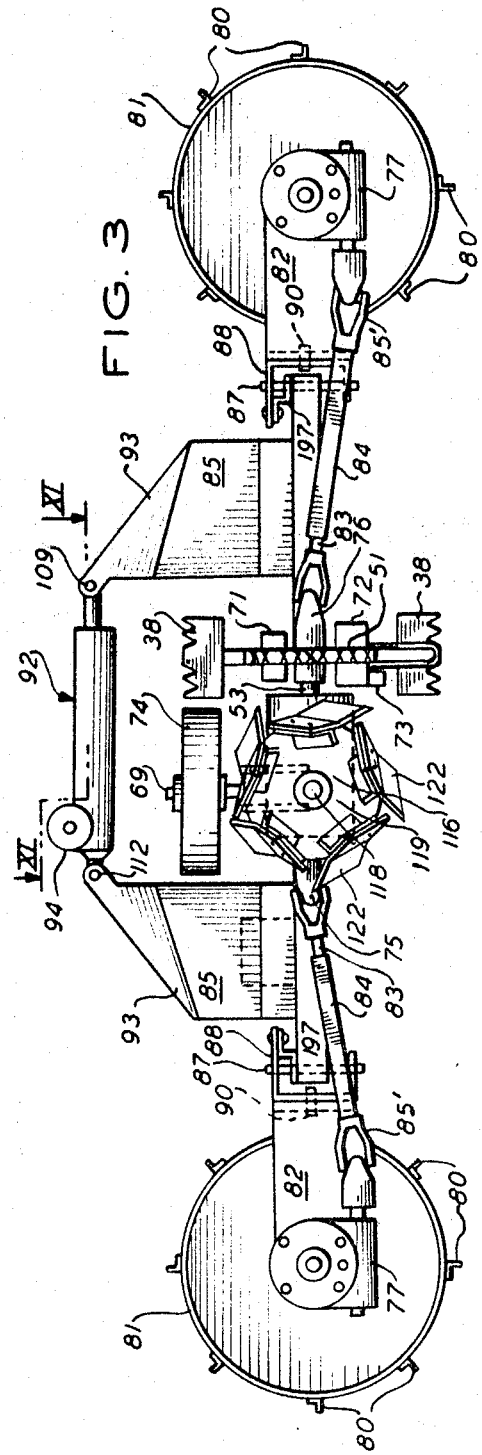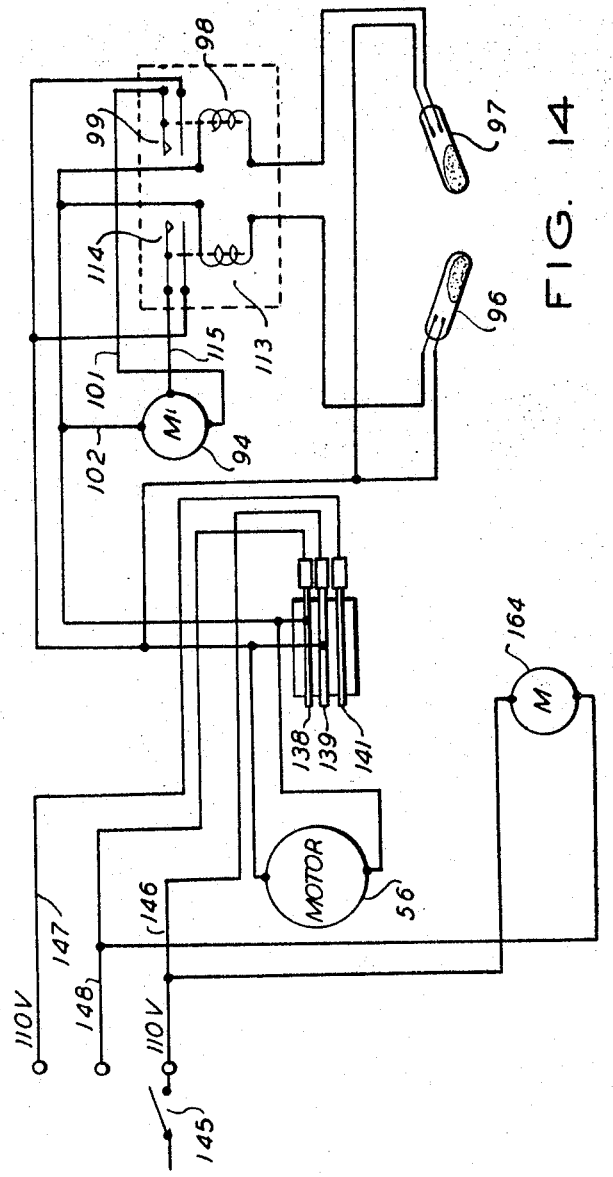

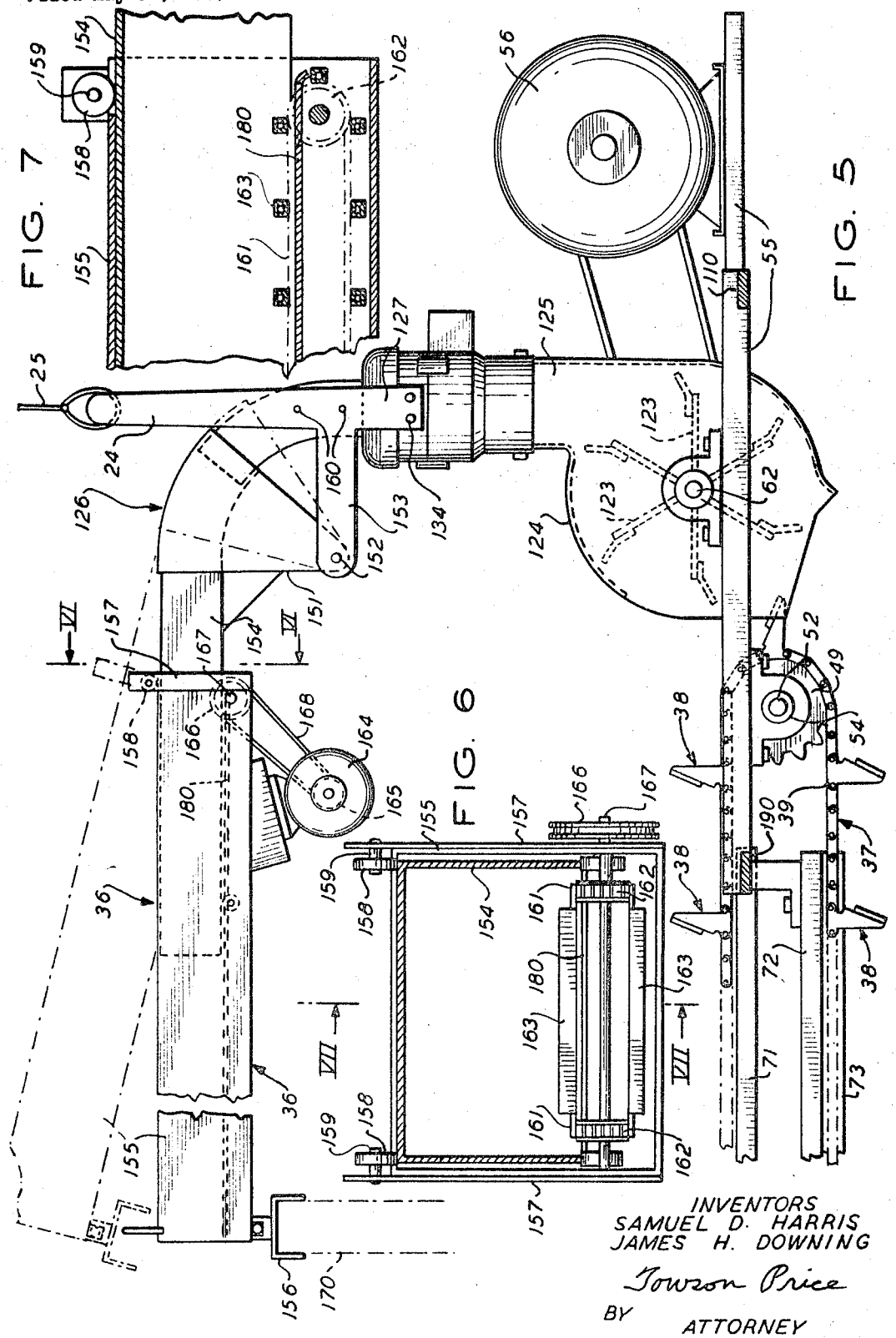

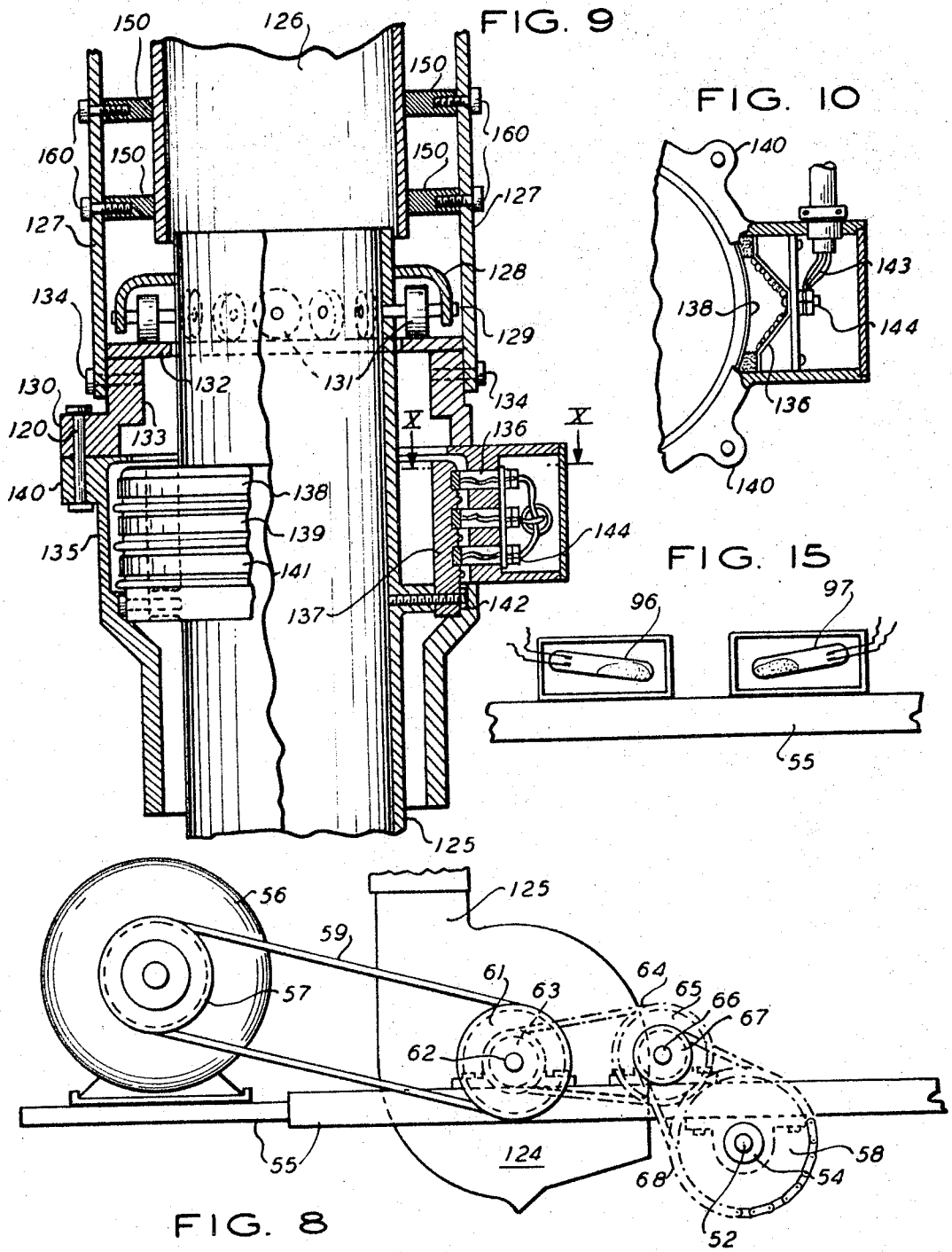

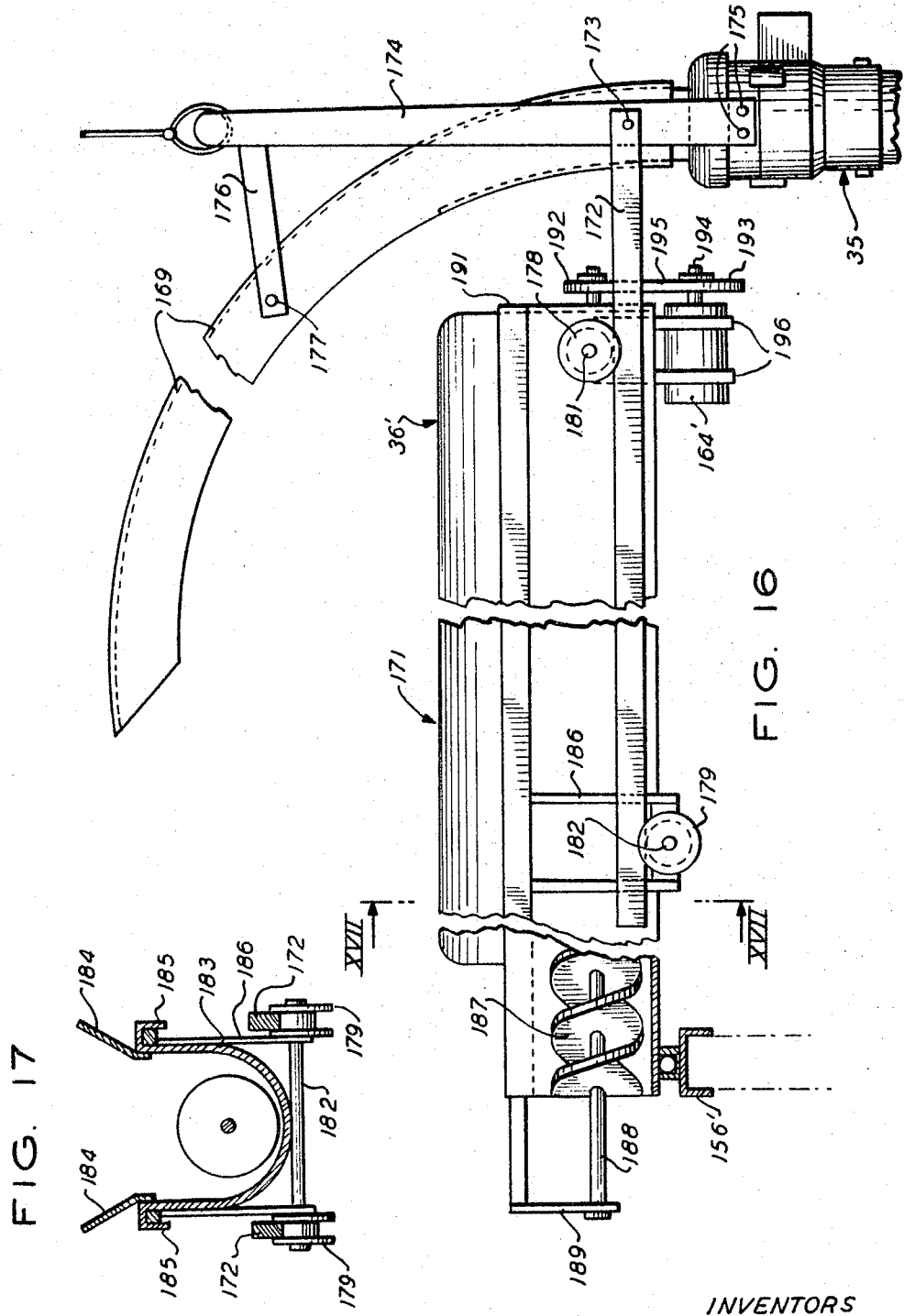

Aug. 19, 1969  S. D. HARRIS ETAL  3,462,199
SILO UNLOADER
Filed May 18, 1967  11 Sheets-Sheet 8
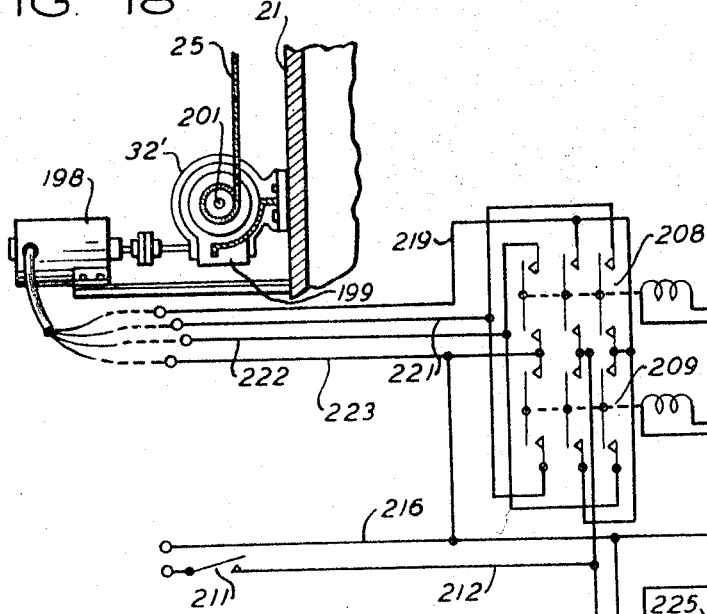
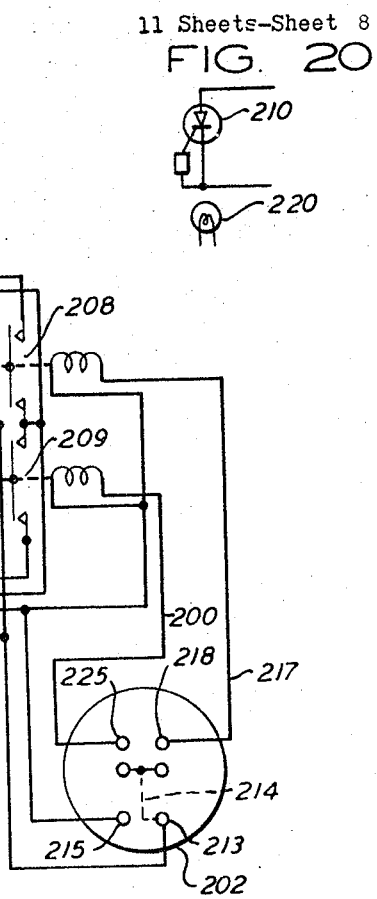
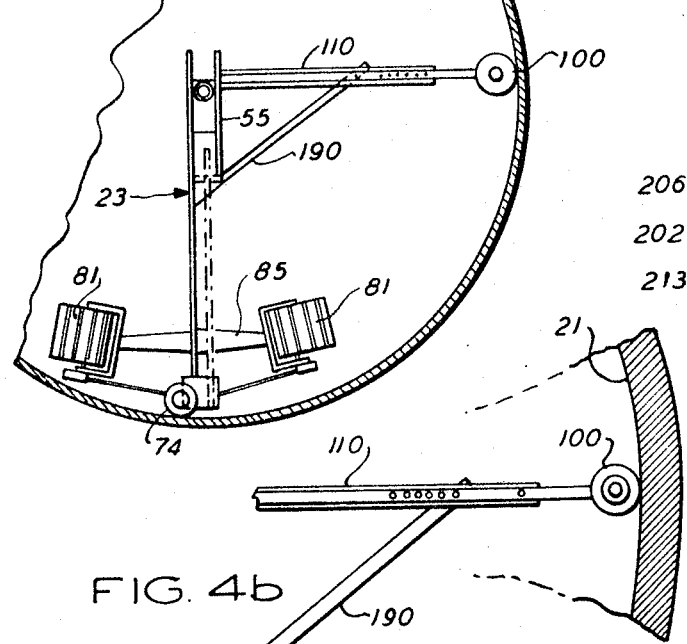
INVENTORS
SAMUEL D. HARRIS
JAMES H. DOWNING
BY Towson Price
ATTORNEY

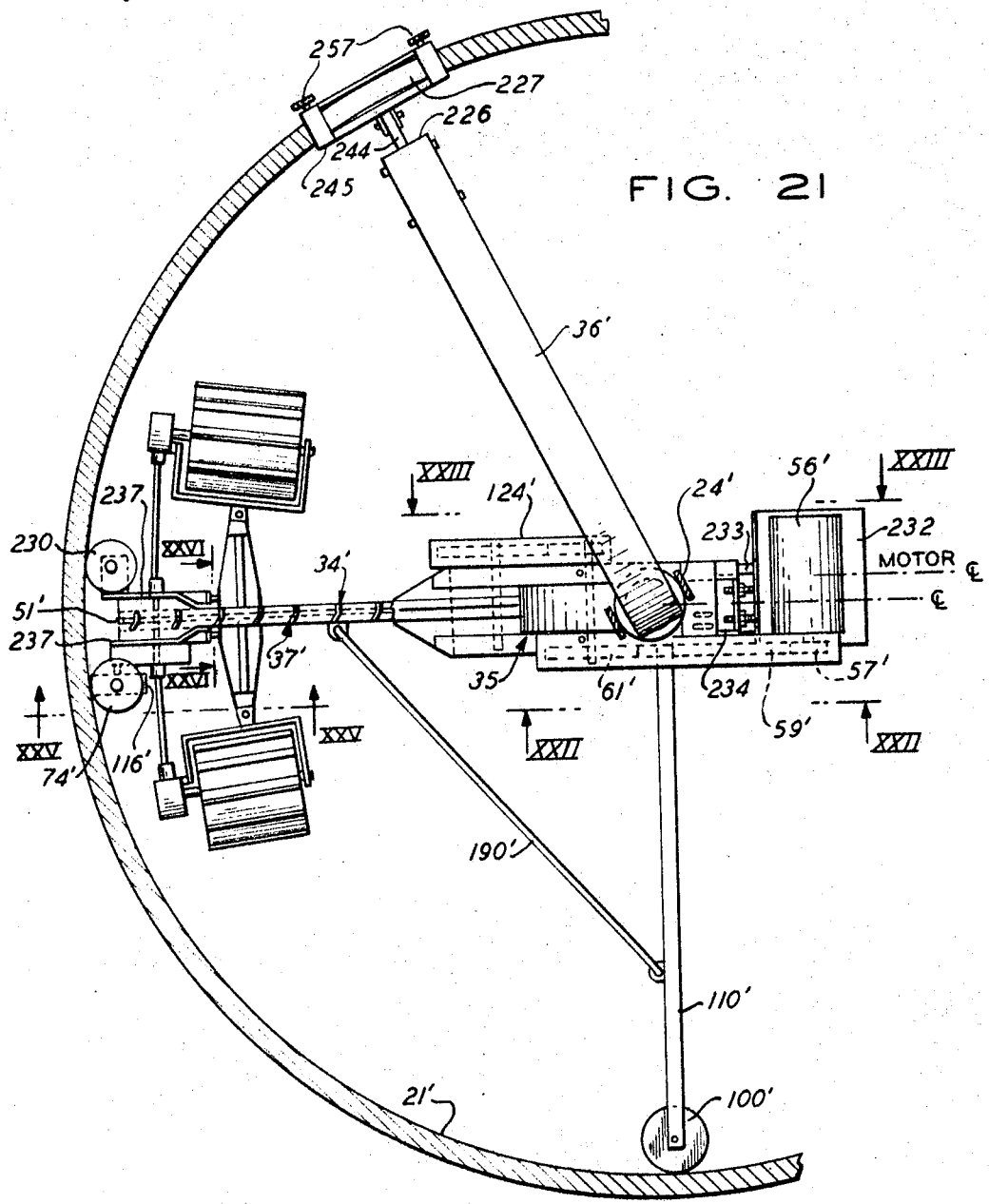

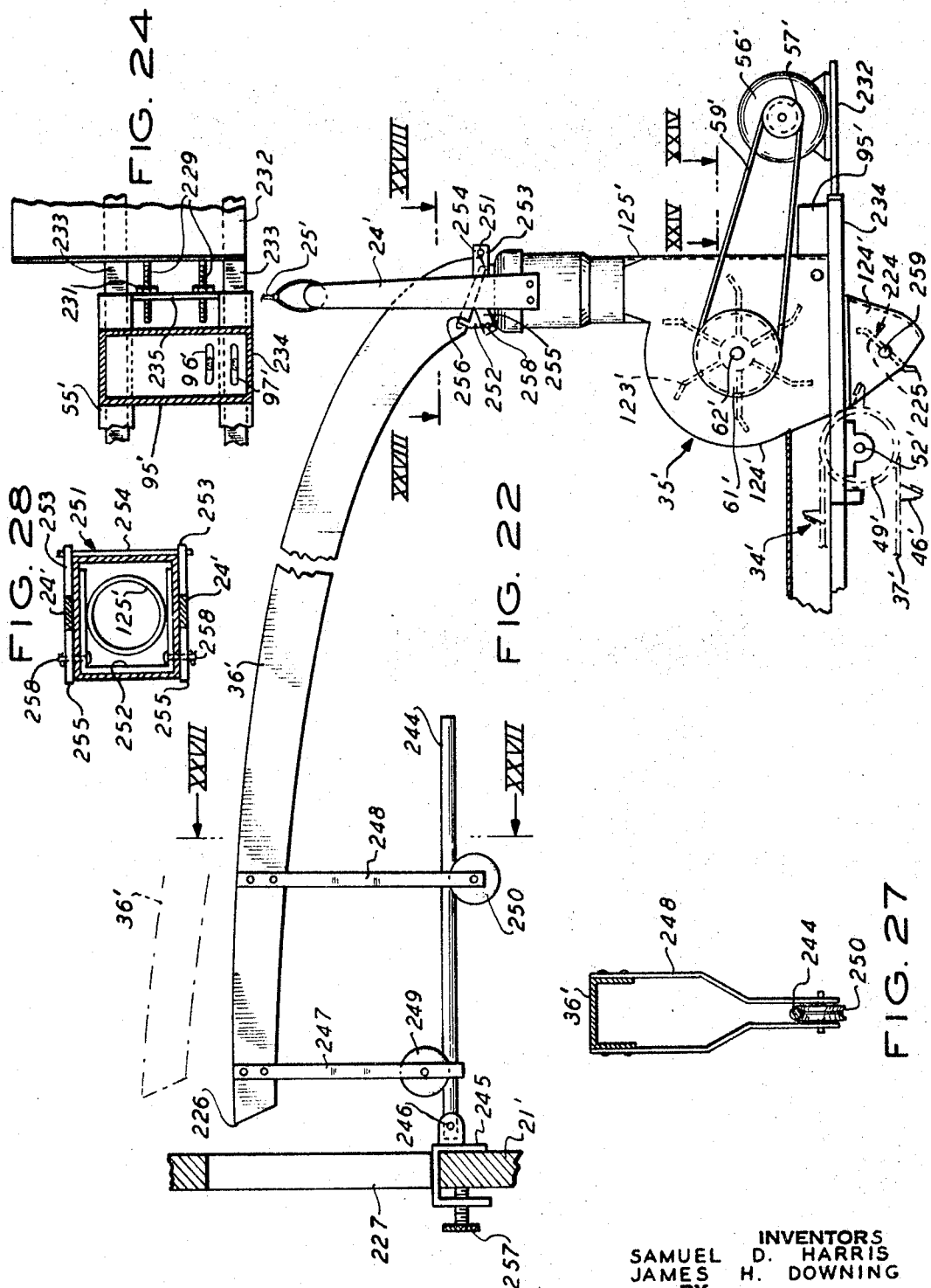

Aug. 19, 1969
S. D. HARRIS ETAL
3,462,199
SILO UNLOADER
Filed May 18, 1967
11 Sheets-Sheet 11
FIG. 25
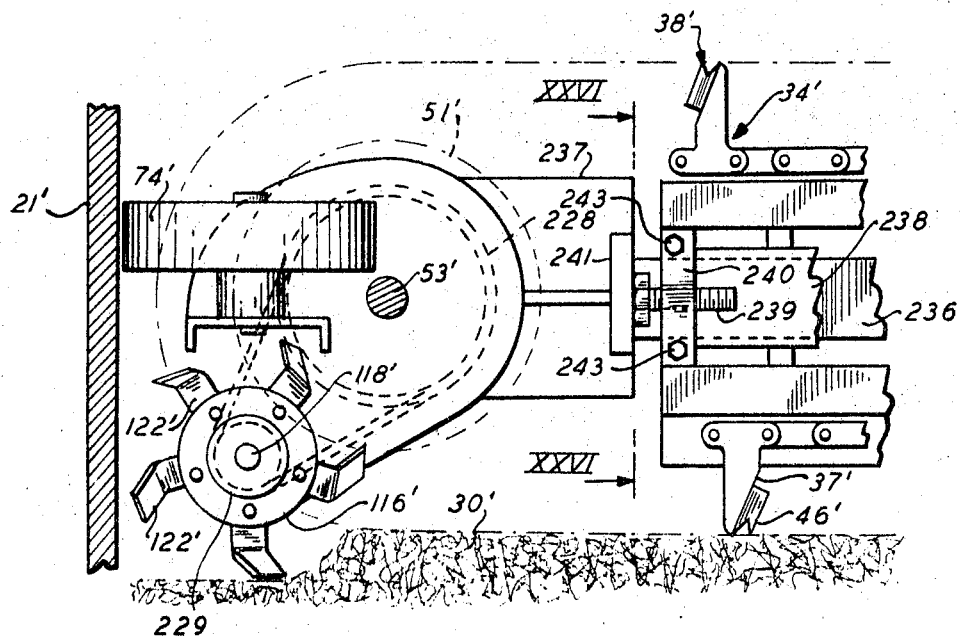
FIG. 26
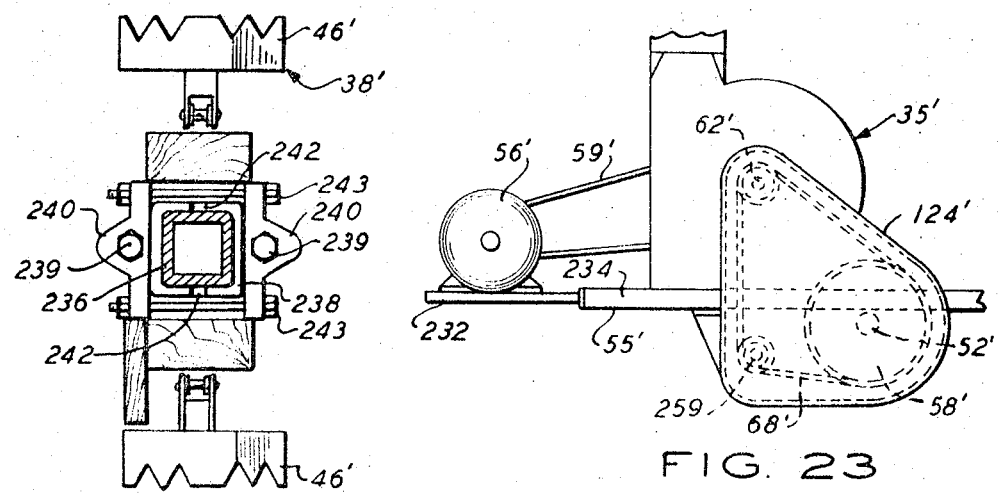
FIG. 23
INVENTORS
SAMUEL D. HARRIS
JAMES H. DOWNING
BY
Towson Price
ATTORNEY United States Patent Office 3,462,199
Patented Aug. 19, 1969

3,462,199
SILO UNLOADER
Samuel D. Harris and James H. Downing, Louisa, Va., assignors to Harris Company, Inc., Mineral, Va., a corporation of Virginia
Continuation-in-part of application Ser. No. 566,409, July 19, 1966. This application May 18, 1967, Ser. No. 648,518
Int. Cl. B65g *53/40, 65/36*
U.S. Cl. 302—56                23 Claims

ABSTRACT OF THE DISCLOSURE

A silo unloader in which a first part gathers ensilage from the outer periphery toward the center, while it rotates around the interior of the silo, a second part which blows the gathered ensilage either out of the silo or up to a third, or discharge, part which conveys it to the outside of the silo, power being supplied from the outside through slip ring means to a main motor which drives the first and second parts and a control motor which effects a proper leveling of the machine.

---

This application is a continuation-in-part of our application Ser. No. 566,409, filed July 19, 1966, now abondoned.

This invention relates to material handling equipment and, more especially, to silo unloaders of the type having collecting means for bringing ensilage into approximately the center of a silo, means for elevating such ensilage, and means for delivering said elevated ensilage from the silo.

Silos, since their inception, have presented the problem of easy and ready removal of ensilage therefrom. This is particularly intensified by the fact that relatively small quantities of ensilage are to be removed frequently.

Present-day silos usually comprise an upright hollow generally-cylindrical structure, closed by a conical or semi-spherical top or roof and a bottom. The wall of the silo is usually provided with a series of removable doors extending vertically up one side threeof. The ensilage is packed in the silo and serves to maintain the doors in place. As the level of the ensilage descends, the doors are removed one by one.

The hand method of removing ensilage from a silo is to climb up the silo, stand on the ensilage, and pitch the desired quantity of ensilage out of a door opening. Particularly, when the ensilage has been frozen, this is time consuming and sometimes dangerous. Various automatic unloaders have been proposed for removing ensilage from silos, but these unloaders have been unsatisfactory since they have required special adaptation of the silo, or are extremely complicated, cumbersome, or expensive to construct, and do not provide the desired adaptability and positive rate of flow of ensilage.

It is, therefore, an object of our invention to provide positive power means to electrically maintain the frame of a power-operated unloader for the ensilage in a silo in an approximately level condition at all times.

Another object of our invention is to control the operation of the leveling means by electrical switches actuated by tilting the frame and disposed at an advantageous position thereon.

A further object of our invention is to provide our unloader with an anti-friction roller slip ring support device at its inner end.

A still further object of our invention is to provide a new and useful silo unloader of rugged and inexpensive construction, which may be readily utilized in conventional silos and does not require modification thereof.

An additional object of this invention is to provide a new and useful silo unloader, whereby desired quantities of ensilage may be removed frequently and which unloader will operate under adverse conditions and require little or no servicing, means being provided for automatically moving the unloader closer to the ensilage if the required drive power, represented by the strength of the electric current drawn, decreases beyond a set point and raising the unloader if such power increases beyond another set point.

These and other objects of the invention reside in specific constructional details, including those of the preliminary cutting wheel, the gathering of collecting arm, apparatus for driving the same, the structure for elevating the ensilage at the center of the silo to the discharge means, means intermediate the collecting arm and elevating structure for stepping up the ensilage transfer speed, and in the structural details of said discharge means.

In the drawings, wherein like reference characters denote like parts in the several views:

FIGURE 1 is a perspective view of a silo unloader embodying our invention.

FIGURE 2 is a fragmentary plan showing the outer part of the unloader of FIGURE 1.

FIGURE 3 is an end elevational view of the parts of the unloader illustrated in FIGURE 2.

FIGURE 4a is a fragmentary horizontal sectional view of the silo and unloader on the line IVa—IVa of FIGURE 4 in the direction of the arrows.

FIGURE 4b is a fragmentary plan of part of the structure shown in FIGURE 4a, but to a larger scale.

FIGURE 5 is a fragmentary side elevational view of our unloader, as in FIGURE 4, but to a larger scale.

FIGURE 6 is a tranverse sectional view of the ensilage ejector portion of our unloader, on the line VI—VI of FIGURE 5, in the direction of the arrows.

FIGURE 7 is a longitudinal sectional view of said ejector portion, on the line VII—VII of FIGURE 6, in the direction of the arrows.

FIGURE 9 is a fragmentary axial sectional view of the inner parts of our unloader from the side thereof opposite that of FIGURE 5.

FIGURE 9 is a fragmentary axial sectional view of the vertical elevating conduit of our unloader, with parts in side elevation and to a scale larger than that of FIGURE 5.

FIGURE 10 is a fragmentary horizontal sectional view on the line X—X of FIGURE 9, in the direction of the arrows.

FIGURE 12 is a detailed side elevational view of one of the digger chain elements and associated links and connecting pins, viewed from the side opposite that of FIGURE 5 and to a larger scale.

FIGURE 13 is a detailed front elevational view of the elements of FIGURE 12, or as said elements appear on the top flight of the digger chain of FIGURE 3, but to the scale of FIGURE 12.

FIGURE 14 is a wiring diagram to show how the several drive motors are controlled.

FIGURE 15 is a fragmentary elevational view of a part of the unloader frame showing the pair of mercury switches of the wiring diagram mounted thereon.

FIGURE 16 is a fragmentary side elevational view, corresponding generally to the upper part of FIGURE 5, but showing a modified form of the ensilage ejector portion.

FIGURE 17 is a transverse sectional view of the ensilage ejector portion on the line XVII—XVII of FIGURE 16, in the direction of the arrows.

FIGURE 18 is a wiring diagram of the unloader elevating and lowering control of the present invention, including a rear elevational view of the instrument of FIGURE 19.

FIGURE 19 is a front elevational view of the instrument for operating the control of FIGURE 18.

FIGURE 20 is a fragmentary diagram of one of the "electric eyes" as part of the instrument of FIGURE 19.

FIGURE 21 is a fragmentary plan of a third embodiment of our invention, corresponding to FIGURES 2, 4a and 4b.

FIGURE 22 is a fragmentary side elevational view of said third embodiment, corresponding to FIGURE 5 and on the line XXII–XXII of FIGURE 21, in the direction of the arrows.

FIGURE 23 is a fragmentary vertical sectional view corresponding to FIGURE 8 and on the line XXIII—XXIII of FIGURE 21, in the direction of the arrows.

FIGURE 24 is a fragmentary horizontal sectional view on the line XXIV–XXIV of FIGURE 22, in the direction of the arrows.

FIGURE 25 is a fragmentary vertical sectional view corresponding to part of FIGURE 1 and on the line XXV—XXV of FIGURE 21, in the direction of the arrows.

FIGURE 26 is a fragmentary vertical sectional view corresponding to part of FIGURE 1 and on the line XXVI—XXVI of FIGURES 21 and 23, in the direction of the arrows.

FIGURE 27 is a fragmentary vertical sectional view corresponding to FIGURE 6 and on the line XXVII—XXVII of FIGURE 22, in the direction of the arrows.

FIGURE 28 is a fragmentary horizontal sectional view on line XXVIII—XXVIII of FIGURE 22, but to a larger scale to show the chute-aperture-closing flap.

Figure 4:
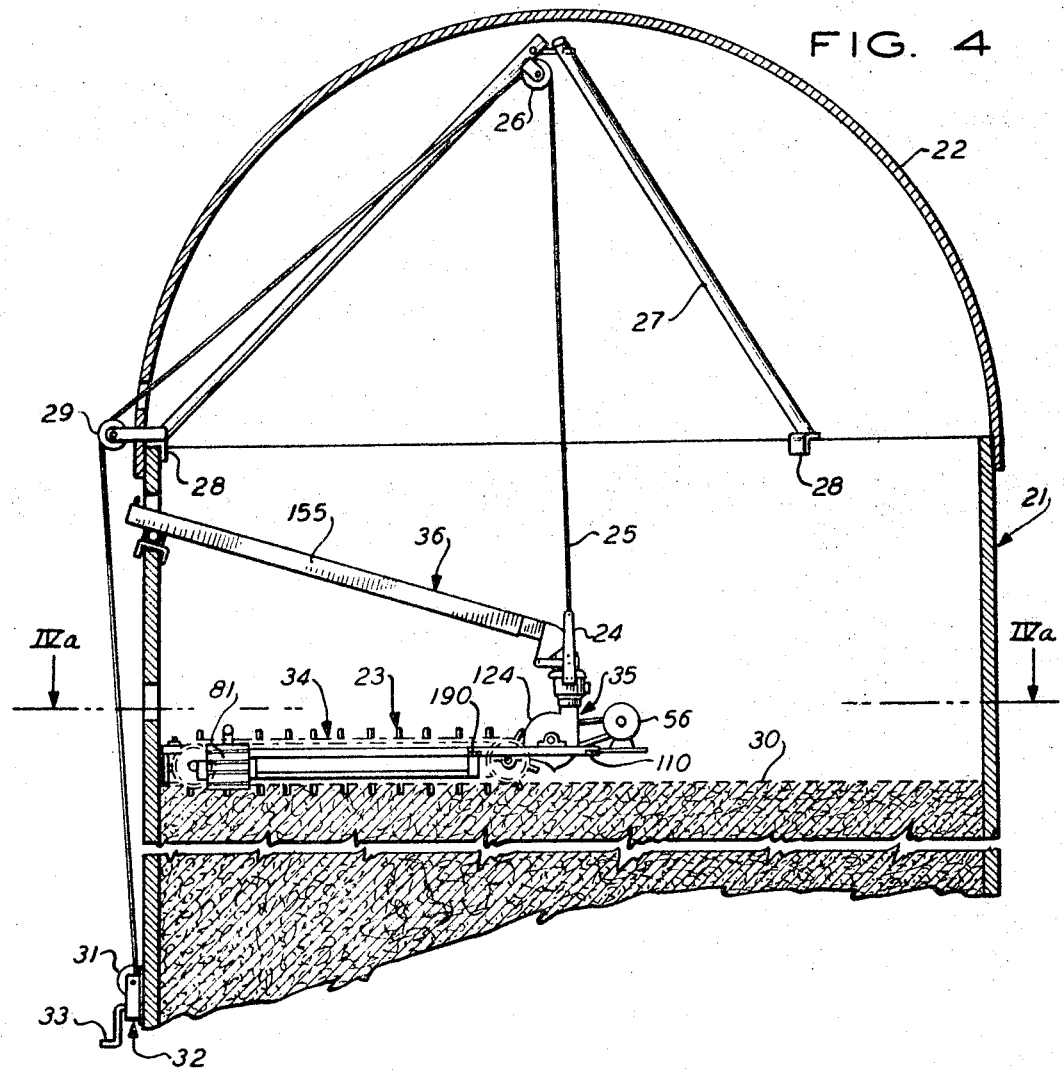
FIGURE 4 is a vertical sectional view of a silo with our unloader shown therein in side elevation.

Referring to the drawings in detail, let us first consider the embodiment of our invention illustrated in FIGURES 1 to 15, inclusive. In FIGURES 4, 4a and 4b this embodiment is shown set up in a silo 21, capped by a hollow semi-spherical dome or roof 22. The silo 21 is hollow and here formed generally cylindrical about a vertical axis. The present embodiment of our silo unloader, generally designated 23, has its inner portion provided with a swivel supporting device or hanger 24, to the upper end of which is attached a cable or rope 25.

The cable 25 here passes up to near the silo dome 22, around a pulley 26, here shown supported by a tripod 27. The lower ends of the tripod legs are provided with angular feet 28 which fit over the top edge of the hollow cylindrical portion of the silo 21. The cable 25 then continues down and toward the outer surface of the silo 21, being guided over a pulley 29 to the drum 31 of a suitable actuating device or hoist. The hoist may be a power-operated winch 32', such as illustrated in FIGURE 18, or one 32 manually operated by an operating handle 33, as shown in FIGURE 4. Rotation of the handle 33 about its connection with the hoist 32 will thus wind or unwind the cable and effect a corresponding raising or lowering of the supporting device 24 and the connected inner portion of the unloader 23 with respect to the engaged ensilage 30.

The unloader consists of three main parts, each of which is composed of a number of elements. These main parts are broadly, first, second, and third ensilage transporting means. The first or gathering means, generally designated 34, is for scraping or digging ensilage from the top of that in the silo 21 and moving it generally radially, but circumferentially to some extent, toward the silo axis or center. The second means, generally designated 35, is for receiving and transferring or elevating ensilage delivered near the silo axis by the first means 34. The third means, generally designated 36, is for receiving and conducting ensilage, delivered by the second means 35 through a conduit 125, from the top of said second means 35, finally to discharge it laterally from the silo.

The parts of the first means are illustrated in FIGURES 1 to 5 inclusive, 8, and 11 to 15, inclusive. Said first means 34 comprises an endless sprocket digger chain 37 carrying paddles or ensilage-collecting elements 38, shown most clearly in FIGURES 1 and 5. Each element 38 is desirably constructed, as shown in FIGURES 12 and 13, to include a base portion 39 formed as a pair of bearing pins 41, each carrying a roller 42 and connecting the free ends of a body portion 43. Each body portion 43 has side plates 44 united along a curved part remote from its pins 41 and by an inclined transverse plate portion 45. A desirably toothed digger plate 46 is secured to the portion 45 by suitable means such as welding.

The chain 37 is completed by a suitable number of links 47 secured to opposite ends of other but corresponding pivot pins 48, also carrying rollers 42. The chain is properly carried on and passes around a drive sprocket wheel 49 and a driven sprocket wheel 51, the teeth of which are spaced to correspond with the roller spacing. The wheels 49 and 51 are respectively fixed on suitable drive and driven shafts 52 and 53 carried in bearings 54 mounted on the frame 55 of the unloader 23. Adjustment of the tightness of the chain 37 may be effected by turning the adjustment means 50 (FIGURE 2) threaded to a boss 60 on the frame 55. The other end of the means 50 is suitably connected to bearing means for the shaft 53, as through bracket 40 secured to gear box 117, as illustrated in FIGURE 2.

Power means for the chain 37, here most clearly shown in FIGURE 8 as an electric motor 56, is also carried on the frame 55. It carries a sprocket wheel or pulley 57 driving a sprocket wheel 58 fixed on shaft 52 through suitable speed-reducing means. Said speed-reducing means here comprises a chain or belt 59 sprocket wheel or pulley 61 fixed on horizontal blower drive shaft 62, desirably parallel to, above and behind, or disposed inwardly of, the chain drive shaft 52, sprocket wheel 63 also fixed on said shaft, chain 64, a sprocket wheel 65 on jack shaft 66, sprocket wheel 67 also fixed in said shaft, and chain 68 to said sprocket wheel 58. This places the blower or centrifugal fan 123 directly in line with, or in the vertical plane of, the gathering chain 37, rather than beside it.

This chain 37 is guided between the sprocket wheels 49 and 51 by a slide board 71 and a hold-down board 72. Board 71 keeps the chain from sagging between the sprocket wheels as the chain runs in a vertical plane. Board 72 has a slide thrust portion 73 making it L shape, which allows the chain 37 to be both held down on the ensilage 30 and forced to cut thereinto so as to effectively move the material toward the second means 35, and kept from circumferential deviation while it is rotated counter-clockwise, as viewed in FIGURES 2, 4 and 21. Said thrust portion 73 is thus positioned on the back side of the hold-down board 72, to hold the chain 37 in a straight line. With this L-shaped guide, the chain 37 is thus held straight in two directions. A wall wheel 74 is positioned on the end of the frame 55 and turns about a vertical shaft 69, so that it can roll against a vertical silo wall and hold the chain 37 at a safe distance therefrom. Another wheel 100 is desirably rotatably and adjustably supported from the frame 55 to engage the silo wall about 90° in advance of the wheel 74, about as in the Harris Patent No. 2,801,885, dated Aug. 8, 1957.

Specifically, a wheel supporting member 110 carries the wheel 100 at its outer end and has its inner end connected to and extends approximately at right angles from a side of the frame 55, as viewed in FIGURES 1, 4, 4a and 5. The member 110 is braced with respect to the frame 55 by a diagonal member 190 extending from said frame to be adjustably pin connected to an intermediate portion thereof, as shown in FIGURES 4a and 4b. Adjustability of the member, which slides in the supporting member 110, may be provided for as here illustrated and as described in the Harris patent referred to.

The two ends of the driven shaft 53 are extended and carry universal joint assemblies 75 and 76 on said extensions. The other end of each of the universal assemblies is connected to a worm gear box 77 and powers the gears thereof through rotation derived from movement of the digger chain 37 to turn the driven sprocket wheel 51. The output shafts 78 of the worm gear boxes 77 are at right angles to the input shafts 79 and form axles on which are fixed the drive wheels 81.

The frames 82 for these drive wheels 81 each connects to its gear box 77 on one side and a bearing for its shaft 78 on the other. They take the torque of the gear boxes and support the weight transferred to the drive wheels 81, which are desirably provided with projecting ribs or cleated, as indicated at 80, to prevent slippage and thereby afford greater tractive effect. The connection from each of the universal jonts, 75 and 76, to the respective gear box 77 is through a rod 83 non-circular or square in section which slidably fits a socket 84 of similar section in the adjacent universal joint assembly 85' between it and the corresponding gear box 77. This allows for slidable adjustment of the rods 83 in their sockets 84 as the drive wheels 81 twist, or move up, down or sideways.

The wheels 81 are connected to the frame 55 by members 85 which have horizontal pivot connections 86 with angle irons 70 which are secured to, and have end portions projecting from, said frame 55, as shown in FIGURE 2. The wheel frames 82 have vertical pivot members 87 connecting them to the members 85. The purpose of these vertical connections 87 is to allow the wheels 81 to be set and locked to a desired curvature so that they will run in a fixed circular path. This is effected by a plate 88, carried on each frame 82 by a horizontal pivot pin 90 (FIGURE 3) and provided with an arcuate slot 89 receiving a locking bolt 91 carried by each member 85. There is a separate nut which, when the bolt is inserted in slot 89, then through a plate 197 with a single hole in it, carried and fixed on member 85, squeezes together the plates 88 and 197. The nut carried by said bolt 91 is tightened on the end thereof that sticks through slot 89. This tightening binds the mentioned parts together. The universal joint assemblies allow power to be transferred to the wheels 81 at whatever angle they are set.

In order to get the weight of the outside end of frame 55 transferred to the drive wheels 81, a powered linear actuator 92 is connected to upright arms 93 that are fastened to the connecting members 85, as shown in FIGURES 1, 2, 3 and 11. When the linear actuator 92 lengthens, it forces the upper connecting points of the upright arms 93 farther apart. This causes downward pressure to be applied to the axles of both wheels 81 and at the same time lifts up the outer end part of the frame 55 from the surface of the ensilage. If the actuator 92 shortens, it lets the upper ends of the arms 93 come closer together and lowers the outer end part of the frame 55. The digger chain 37 is mounted on the frame 55 so that the amout of material it cuts on the outside end is controlled by the length of the actuator 92. The center portion of the machine and its frame is raised or lowered by the cable 25 controlled by the winch 32.

Figure 11:
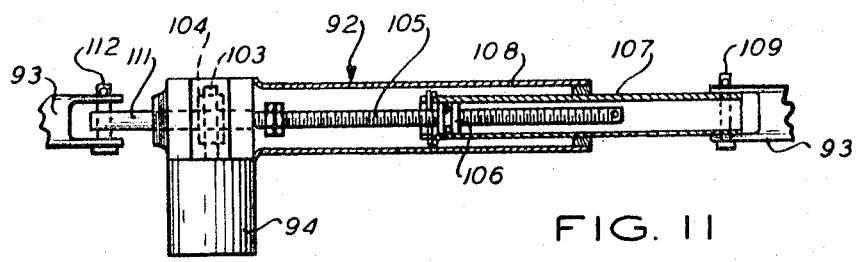
FIGURE 11 is a fragmentary plan with parts in horizontal section, showing the powered linear actuator of our unloader to a scale larger than that of FIGURE 3.

The construction of one embodiment of the linear actuator 92 is shown in FIGURES 2 and 11, where the power means is a reversible electric motor 94. The motor 94 is controlled by a level sensing device 95, to keep the frame 55 approximately level, without undue operation, from its outside end to the center of the structure. When the cable 25 is raised, it picks up the part of the unloader 23 which is near the center of the silo. The outside end of said unloader rests on the surface of the ensilage 30, and such lifting, or lowering, causes the frame 55 to deviate from the horizontal.

The level sensing device 95 reacts to this deviation, where the outside end of the unloader is too low, by sending a signal through a relay which causes the actuator 92 to lengthen. This action raises the outside end of the unloader 23 until it becomes approximately level, or at the same elevation as the center, at which time the sensing device stops the actuator's movement. When the cable 25 is lowered, it again may cause an unlevel condition, but in the opposite direction. The level sensing device 95 would then react to this opposite condition with an opposite signal through another relay which causes the actuator 92 to shorten. This would lower the outside end until the unloader again becomes level, at which time it stops the actuator's movement.

Specifically, the level sensing device 95 here may comprise a circuit, illustrated in FIGURE 14, including a mercury switch 96 inclined outwardly from the center or toward the silo wall to a slight extent, one switch 97 inclined inwardly toward the center or from silo wall to a similar extent, and both mounted on the frame 55 as shown in FIGURE 15. As an alternate, we contemplate putting all of the mercury in a single tube with contact points in each end, rather than in two tubes as shown. We also contemplate as another substitute the use of any other control switch 95 that senses an unlevel condition and sends an electric correction signal to the actuator 92 or any electrically controlled lifting device. When the frame 55 tilts from the horizontal through more than a selected angle, say .5°, so that the outer end of said frame is undesirably low, the mercury in the switch 97 effects initiation of an electric circuit through a relay 98, closure of its switch 99, the energization of motor 94 through leads 101 and 102, and operation thereof to lengthen the linear actuator 92, lower the wheels 81, and correspondingly raise the outer end of the frame 55 to restore it to a desired approximation of level.

This is affected by the turning of a worm 103 on the shaft of motor 94, which engages a wheel 104 fixed on a threaded shaft 105. This shaft turns in a nut 106 fixed in the end of a sleeve 107, telescoped in a housing 108 fixed to the motor 94 and extending at right angles to its shaft. The outer end of the sleeve 107 is connected to the top of the right-hand arm 93 by a horizontal pivot pin 109. The outer end of the stud 111, projecting to the left from the housing 108 is similarly connected to the left-hand arm 93 by a horizontal pivot pin 112, as shown in FIGURES 3 and 11.

When the frame 55 tilts from the horizontal in the opposite direction, first the mercury in the switch 97 breaks its circuit and the motor 94 stops running. If such tilting continues through more than .5° beyond the horizontal so that the outer end thereof is undesirably high, then the mercury in the switch 96 effects initiation of an electric circuit through a relay 113, closure of its switch 114, energization of motor 94 through leads 101 and 115, and operation thereof in the reverse direction to shorten the linear actuator, raise the wheels 81, and correspondingly lower the outer end of the frame until it is restored to approximately horizontal condition.

In order to remove ensilage which might stick to the side of the silo as the unloader descends during removal of ensilage therefrom, we provide an ensilage cutting wheel 116 suitably geared to the driven shaft 53 in gear box 117 so as to be rotated by a normally horizontal drive shaft 118, or one whose axis lies in the horizontal plane of the driven gear shaft or a plane parallel thereto, as shown most clearly in FIGURES 1, 2 and 3, to start moving the cut ensilage toward the radial plane of the chain 37. This wheel is here shown constructed as a disc 119 with a hub 121 fixed on the shaft 118 and a plurality of cutting blades 122, in this instance five, constructed as there illustrated. These blades, although generally square, are set at an angle to the plane of the disc 119 so as to present corners as well as edges for the more effective cutting of the ensilage. This effect is also improved by slightly bending the plates as illustrated.

The ensilage, which is moved toward the center of the silo by a digger chain 37, is received at that place by the second ensilage transporting means 35, illustrated most clearly in FIGURES 4, 5, 9 and 10. This means comprises in the main a centrifugal fan, blower or impeller 123, turning about the horizontal shaft 62, and enclosed in a housing 124. This blower 123 turns counterclockwise, as viewed in FIGURE 5, and directs a blast of air from its lower and left side portions, as viewed in FIGURE 5, to its discharge or upper outlet portion 125. This means that the ensilage is moved in a direction generally tangential to the outline of the blower 123, as viewed in FIGURE 5, rather than parallel to its axis as is usual. It is transported to a position immediately to the left and below the housing 124 to be drawn thereinto by a draft of air. After entering the housing, the ensilage is carried, without having to be turned through a sharp angle, and partly air-blown and partly thrown by the vanes or paddles of the blower 123 to the right and up into the discharge outlet portion 125, from whence it passes to the receiving conduit or curved deflecting chute 126 of the third ensilage moving means 36. It is this housing 124 that is directly supported by the cable 25 through the medium of the swivel supporting device or hanger 24. Support of the housing in this manner is effected by the means most clearly illustrated in FIGURES 1, 9 and 10. The parts there shown are desirably assembled in the following manner:

Near the top of the outlet portion of pipe 125 of the blower housing 124 is welded a drum head or roller housing 128 that has been cut to fit over the outside of said pipe 125. Then we drill through the side of the head 128 and through the pipe 125 a series of holes to receive the axles or shafts 129 for a series of rollers 131. Six or more of these rollers are desirably employed, equally spaced around the head 128. We put these rollers in the space between the head 128 and the pipe 125, place the shafts 129 through the formed holes, and weld said shafts on their ends so they won't come out, making a pipe and roller assembly.

We then make a thrust plate 132 that fits freely around the outside of the pipe 125 and lies mainly inside of the head 128. The arms 127 of the swivel supporting device or hanger 24 are bolted to a thick boss 133, secured to or formed on each side of the thrust plate 132, as by means of cap screws 134. This holds the weight of the machine's inner end portion at the center of the silo. In order to effect an electrical connection to the electric motors to operate our unloader, there is provided a shell 135 which telescopes over the pipe 125, holds brushes 136 and is attached to the thrust plate 132 by suitable means such as bolts 120 passing through lugs 130 and 140, respectively outstanding from the thrust plate 132 and shell 135.

A ring 137, on which are mounted three electrically conductive bands 138, 139 and 141, is slipped over the pipe 125 and the assembly put into the shell 135 that holds the brushes. It is then attached to the pipe 125 by suitable means such as cap screws 142, so as to turn therewith and receive electric power from the brushes 136 during operation of the unloader. The brushes 136, see FIGURE 10, are then placed in their holders on the shell 135. They are provided with springs or are otherwise formed resilient so that they are pressed at all times against the conductive bands 138, 139 and 141. The power wires 143 going to the machine are then connected to the brushes by means of terminals 144.

The power wires are controller by switch 145 and include those designated 146, 147, and the ground wire 148, as shown in the wiring diagram of FIGURE 14. The conductive bands 138, 139 and 141 are supplied by these corresponding three wires. The slip ring 137 may be made of plastic or other non-conductive material to insulate the bands from one another and from other metal parts of the machine. The brushes 136 are similarly insulated from one another. The whole roller and slip ring assembly, consisting of the enumerated parts, is attached to the blower housing 124 of the machine. The arms 127 hold the discharge-receiving means by being attached to spacer blocks 150 secured to the receiving chute 126 of the third ensilage-moving means 36, by suitable means such as bolts 160. When the hanger 24 is lifted, all the weight of the suspended parts is on the rollers 131 which can turn freely. Electric power can thus flow into the motors and the unloader will collect and discharge ensilage, while rotating on the top of that in a silo, without any difficulty.

After the ensilage has been caused to pass through the blower 124 and up the discharge portion 125, it is directed to the third ensilage transporting means 36 through curved conduit generally designated 126, in which its upper end portion is telescoped, which conduit includes a portion 151 pivoted by a pin 152 to arms 153 extending to the left from the swivel supporting device 24, as viewed in FIGURE 5. This pivoted portion 151 allows for a movable telescoping between the upper curved portion of 125 and the lower part of the conduit 126, as well as between said portion 151 and the inlet conduit member 154 of the third ensilage transporting means 36.

The third ensilage transporting means 36 comprises an outer conduit 155, the outer end of which is supported on the top of a part 170 of the silo defining the lower limit of and providing the bottom ledge of an opening therein, as on a roller-holding member 156, so that it can slide to a limited extent. As the level of the ensilage 30 in the silo drops, this outer conduit 155 may move, as from the position shown in full lines to that shown in dot-dash lines in FIGURE 5. This movement is permitted by the mounting of the conduit 155 on the inlet member 154, as shown most clearly in FIGURES 5, 6 and 7, such including the bail 157 underlying and secured to the inner end of the conduit 155 and carrying rollers 158 on pivot members 159, which ride at the top of the conduit 154, which is open at its bottom except for the floor portion 180.

After the ensilage has been transported from the partly open bottomed conduit 154 to the larger upwardly-opening one designated 155, by the blast of air and momentum imparted to the ensilage by the blower 123, it is carried to the left-hand or outer end of said conduit 154 and discharged into the conduit 155 and from it out of the silo by conveyor chains 161. Said conveyor chains pass endlessly over carrying rollers 162, only the inner one of which is shown in FIGURE 7. These chains carry a plurality of cross bars 163, desirably generally square in transverse section, as shown in FIGURES 6 and 7, to insure that the ensilage will move over the floor 180 with the chains 161 to the end of the conduit 154 and be discharged from the receiving conduit 155 by the momentum imparted thereto. The power means to drive these chains 161 is here provided by an electric motor 164 mounted on the outside of the conduit 155 and having a pulley or sprocket wheel 165 driving a pulley or sprocket wheel 166 carried by the shaft 167 of the inner carrying roller 162 by means of a belt or chain 168.

Referring now to the embodiment of our invention illustrated in FIGURES 16 and 17, there is disclosed a modification 36' of our third ensilage transporting means, wherein the ensilage is directed from the second ensilage transporting means 35 through a curved spout 169, the upper end portion of which lacks a lower wall, as illustrated, to a conveyor generally designated 171. As in the first embodiment, the conveyor has its outer end supported on the top of a part of the silo defining the lower edge or limit of an opening therein, as on a roller holding member 156', so that it can slide to a limited extent.

In the present embodiment, this conveyor 171 is also adjustably slidable on arms 172, the inner ends of which are pivoted as at 173 to arms 174 which take the place of the hanger 24 of the first embodiment, project upwardly from and have their lower ends secured to the second ensilage moving member 35, as by means of tap bolts 175. The upper end of these arms 174 also serves to support or brace the spout 169, as by means of link members 176 extending from said arms and connected to said spout by suitable means such as rivets or bolts 177.

In the present embodiment, the conveyor 171 has rollers 178 which ride on the arms and rollers 179 which engage the lower edges of said arms, said rollers turning on suitable axles 181 and 182, respectively. The ensilage delivered from the spout 169 is received in a trough 183, the lower portion of which is desirably semi-cylindrical and the upper portion of which has outwardly flared extensions 184, as shown most clearly in FIGURE 17. The upper edges of this trough 183 are desirably bent outwardly and flanged downwardly to form downwarly-opening channels indicated at 185. The structure 186 which carries the axle 182 desirably has its upper ends secured inside of said channel structures 185 as by welding.

Instead of having a conveyor of the type illustrated in the first embodiment, there is here shown a feed screw 187 which is turned by a carrying shaft 188 extending radially of the silo. It turns at its outer end in a bracket portion 189 projecting from the trough 183 and is turnably mounted with respect to the inner wall 191 of said trough to carry ensilage to beyond a silo without relying on momentum. The inner end of the shaft 188 carries a pulley or sprocket wheel 192 driven by a corresponding pulley or sprocket wheel 193 on the shaft 194 of a drive motor 164', as by means of a belt or chain 195. The motor 164' is desirably carried from the trough 183 by supporting straps or the like 196 and receives its electric power in a manner similar to the motor 164 of the first embodiment. Except as specifically described in connection with the present embodiment, the same may correspond with the first embodiment.

The third embodiment of our invention is illustrated, insofar as it differs from the first embodiment, in FIGURES 21 to 28, inclusive, wherein generally similar parts are identified by numbers corresponding with those in the first embodiment, but primed. There is here improved first means 34' for gathering material at the axis or center of the silo 21', as well as improved means 35' for transferring the gathered material into discharge means 36'. The gathering means 34', illustrated in FIGURES 21, 22, 23 and 25 consists of an endless sprocket digger chain 37' with paddles 38' attached, which sweeps around over the surface of the ensilage and delivers it to the axis or center of the silo 21', as in the first embodiment.

A small diameter impeller 224, called a "flipper," is used directly behind or inwardly in line with the digger chain 37'. It is enclosed and carried by the lower part of a housing 124' open on both its top and bottom and partly open on one side which is to receive the material. This impeller or flipper 224 is geared to turn counter-clockwise, as viewed in FIGURE 22, so that the outer edges of its blades 225 move at a faster speed than that of the chain 37'.

There is also a large diameter impeller or blower 123' driven from the motor 56' by a chain or belt 59' passing around motor sprocket wheel or pulley 57' and blower sprocket wheel or pulley 61'. It is placed directly above the first impeller 224, the housing 124' being entirely open between these impellers. The housing outlet or conduit 125' is in one corner at the top side of the hollow cylindrical band of the housing 124' which encompasses the impeller. This impeller 123' turns at an r.p.m. not much, if at all, faster than the flipper 224 but, due to its greater diameter, the ends of its blades or paddles move at several times the speed of the ends of the flipper blades and it has more paddles. In this case the flipper 225 is desirably 9¼ inches in diameter and has two blades, while the blower 123' is desirably 22 inches in diameter and has six paddles. As shown in FIGURE 23, a single sprocket chain or the like 68' serves to drive both the flipper 224 and the digger chain 37' by passing around sprockets wheels fixed on blower shaft 62', flipper shaft 259, and digger chain drive shaft 52'.

When in operation the digger chain 37' pulls and pushes the material toward the center or axis of the silo at a relatively slow speed, but it gets the material in motion. The flipper 224 is desirably turning so that the outer ends of its blades move at a little over four times the speed of the digger chain 37'. It is so located that the paddles of the digger chain 37' push the material into the path made by the flipper paddles. The flipper paddles quickly throw, all of the material the digger chain paddles have pushed back to it, into the large blower 123'. The blower 123' greatly accelerates the material so that it is thrown up the conduit 125' and, by its own momentum, clear out of the silo, being directed by the outlet spout 226 to the door of, or opening 227 in, the silo. There is here no need for a separate powered conveyor in the outlet spout as in the first embodiment.

We are thus, in effect, staging the speed of movement of material or carrying it in steps. The digger chain gets it moving, the flipper adds a faster movement and the blower or large impeller 123' gives a much greater final speed to the material. This saves power because it is more efficient to add speed to a moving object than to hit it when at or near rest.

Another reason for this arrangement is that with a small diameter flipper there is very little distance between the digger chain paddles and the flipper paddle ends. Thus the material can be more directly transferred. The flipper 224 also more effectively cleans the digger chain toothed plates 46'. It should also be noted that the digger chain plates 46' sweep by the blower opening on the top part of the arc they make around the drive sprocket wheel 49'. This gives the blower a chance to suck any small particles of material off them so that no material is carried back to be handled a second time.

A further reason is that the large diameter impeller does not have to eat out its own hole at the center or axis of the silo. It strikes only material that is already moving from the flipper and digger chain. By using a large diameter final stage impeller, we can give enough speed to the material to send it all the way out of the silo. The use of a large diameter blower lets us turn the carrying shaft 62' at a relatatively slow speed, yet the tip edges of the blower paddles are moving at more feet per minute than the paddles of the smaller diameter impeller turning at a high r.p.m. speed. Thus using the larger diameter blower allows us to gear down the machine from the motor 56' and eliminate the need for a jack shaft, such as 66 of the first embodiment, to reduce the speed of the digger chain drive sprocket wheel 49'.

In the present embodiment, we provide a simple, direct-drive for a silage cutter 116' to remove the bank of silage, even if frozen, left at the wall of the silo by the digger chain toothed plates 46', as shown in FIGURES 21 and 25. The cutter is desirably formed as a circular hub portion secured to a shaft 118′ and from the peripheral portion of which radiate, in this instance five, curved knives or blades 122′ the leading edges of which are sharpened, all as illustrated in FIGURE 25. The shaft 118′ on which the cutter is mounted, is here shown below and in front or outside of the digger chain driven sprocket wheel shaft 53′ and turns at a greater speed than said shaft. This arrangement positions the cutter 116′ so that it acts at a plane slightly below the surface of the ensilage 30′ left by the digger chain plates 46′ and also cuts beyond the reach of said plates at the silo wall side. This relieves the chain plates of any contact with material until they have made their turn over the outside sprocket wheel 51′ and started straight back toward the axis of the silo. The cutter 116′ thus makes a slight trench in the material next to the silo wall.

The cutter 116′ is driven counterclockwise as viewed in FIGURE 25 from the shaft 53′ the axis of which is generally perpendicular to the vertical plane of the digger chain 37′ by a sprocket wheel 228 which is secured to the digger chain shaft 53′ and thus starts the ensilage toward the silo center as an assist to the chain. This shaft is turned by the digger chain 37′ being here drawn around the outside or driven sprocket wheel 51′ secured to said shaft. In order to speed up the cutter shaft so that we can get many cuts per minute, the drive sprocket 228 secured to shaft 53′ is here larger in diameter than the driven sprocket 229 which is secured to the cutter shaft 118′. A wheel 74′ which contacts the silo wall 21′ is placed over the top of the cutter 116′ and beside the digger chain to keep both the cutter and the chain paddles from contacting the silo wall. It is desirably supplemented by a similar wheel 230 on the other side of the radial plane of the chain 37′. A standard roller chain drive is desirably used to turn the cutter 116′, as it is much cheaper than a gear box.

The centering arm 110′, which has a diagonal brace 190′ and a silo-wall-engageable wheel 100′ tends to tilt the machine out of normal. This arm acts like a long lever acting downward. In order to counteract this tilting movement, we mount the motor 56′ off-center, that is at the side opposite this arm, in relation to the center of the supporting cable 25′ which is holding up this entire end of the machine. Thus the supporting cable 25′ acts as a pivot, with the light weight but long arm 110′ on one side and the heavy motor 56′ offset to the other side, on a short arm, the proper distance to balance the machine.

In order to adjust the tightness of the drive chain or belt 59′ between the motor 56′ and the blower drive sprocket wheel or pulley 61′, we provide bolts 229 to push the motor base 232 away from the blower housing 124′ to tighten the drive means 59′. The motor base has two arms 233, desirably square in section, which telescope in apertures of appropriate section in the frame 234 of the machine. The threaded bolts 229 project through a cross bar 235 between two frame arms. Nuts 231 are threaded onto the bolts and run up against the cross bar. With these bolts we can force the motor base rearward and thus tighten the belt or chain. The lock nuts 231 are then tightened to hold the desired position.

In order to tighten the digger chain, a similar arrangement is used but with one arm 236. The outside sprocket wheel 51′ is mounted between bifurcations of a yoke 237 which has the desirably square arm or bar 236 projecting toward the silo axis. This bar is received in hollow mating frame bar 238 which lies along the radial axis of the digger chain. This frame bar 238 has two bolts 239, one on each side, threaded into bosses 240 outstanding on each side of the bar 238. These bolts may be turned so that their heads press against two flat outstanding ears 241 on the yoke 237 of the outside sprocket wheel 51′.

We thus can move the whole yoke and its assembly outward and tighten the digger chain because the drive sprocket wheel 49′ is fixed to the inner part of the machine. The frame bar 238 has two slots 242 cut into it and cross bolts 243 are put in the bosses 240 to, after the desired adjustments, squeeze the so-formed bifurcations of said bar against the arm 236 of the outside end assembly to make a rigid connection. It should be noted that the frame arm 236 is positioned on the center line of the digger chain as viewed from the top. This makes the machine balance better, gives it a better appearance, and makes a more rigid construction.

To improve the level-control, we mount the control mechanism, which as here shown is level-sensing device 95′ including two mercury switches 96′ and 97′, on the frame 55′ which is being maintained at a near level condition. The switches extend lengthwise of said frame and lie as near as possible to the lifting point of the cable 25′ which absorbs shock. This means that the device is mounted on the frame just behind the blower 123′, as indicated in FIGURE 22. At this point on the frame there is less vibration and erratic movement that at any other place, and we find that the switches work better here than at any other place.

The improved support means for the delivery or discharge conduit or chute 36′ for a silo unloader of the present embodiment is illustrated in FIGURES 21, 22, 27 and 28. A rod device 244 is pivotally attached to the part of the silo wall 21′ defining the lower limit of the door opening 227. A bracket device 245 with this rod device attached is hooked in the door opening, so that the rod device can pivot vertically and also angle slightly sideways. Set screws 257 are desirably used to clamp the bracket in place as shown. The pin or rod 246 used to connect the rod device 244 to the bracket 245 is, for that purpose, smaller than the receiving holes in said bracket. The discharge chute 36′ has two brackets 247 and 248 attached thereto so as to here hold two flanged support wheels. Flanged wheel 249 rests on top of the rod device 244 and puts a downward pressure thereon. Flanged wheel 250 is positioned under the rod device 244 and puts an upward pressure thereon. It, in effect, holds up the end of rod device 244 remote from the door 227.

This arrangement allows us to support the outlet end of the discharge chute 36′ on rollers, allowing said chute to move freely within the length of the supporting rod device 244. It also holds up the inner end of the supporting rod device 244. By use of the double flanges forming grooves on the wheels 249 and 250, the supporting rod 244 is held in place on the rollers, even though the torque of the machine rotating below is trying to move the discharge chute sideways. The supporting rod device 244 is thus also a torque arm to the points where the wheels engage it. The torque arm is then the discharge chute itself from these points to the axis of the machine.

By positioning the supporting rod device 244 at the center of the bottom ledge of the door 227, the discharge chute 36′ is always directed in line with the doorway opening. The reason wheels or rollers are used is that we wish to keep the friction as low as possible. It must be remembered that the unloader rotating below this arrangement has its outlet discharge into this delivery chute 36′ slightly off the vertical axis of the silo and thus imparts a small crankshaft movement to the discharge chute 36′. This means that with each revolution of the unloader, the discharge chute has to move the supporting rod up and down and also slightly sideways.

Supporting rod device 244 must move vertically because, as the silage is removed, the machine descends and carries the inlet end of the discharge chute 36′ with it. The angle of the supporting rod device 244 gradually changes and must pivot in this plane to compensate for this lowering of the machine. The inlet end of the discharge chute 36′ is pivotally-connected to the slip hanger arms 24′ so that, as the machine goes down, the angle of the chute can change. This pivot connection 251 is below the top of the discharge opening of the slip ring, such as designated 137 in FIGURE 9 for the first embodiment. As the inlet end of the discharge chute 36′ is larger than the outlet end of the conduit 125' above said ring, the chute can come down over said outlet end, as shown for the first embodiment in the figure referred to.

When the discharge chute 36' is moved toward its extreme up or raised position, an opening appears on the side of the chute opposite the pivot point and along the two sides adjacent thereto. A flap 252 is used to cover this opening. The chute 36' is pivoted at a point 251 to the slip ring supporting arms of yoke 24' and the discharge chute 36' slides over the flap. This flap 252 directs up into the chute any material that would have come out of the opening in the chute, when it is above normal or in the extreme up position, thus preventing it from flying out into the silo. When the discharge chute is in the normal or extreme lowered position, it completely covers the entire opening and the flap is then not needed.

The support yoke 24' has its upper end attached to a lifting cable 25' and its lower end fastened to a thrust plate, such as 132 in FIGURE 9. We see only one arm of this yoke in FIGURE 22, but it has another just like it on the other side, as for the yoke 24 of FIGURE 1. Yoke 24' has projections or arms 253 extending laterally therefrom desirably welded to it and carrying the pivot axis or point 251 behind conduit 125', so that a rod 254 can be put from one arm to the other.

Discharge chute 36' is supported on this rod 254 by a tube welded to said chute. To connect chute 36' to yoke 24', the tube on chute 36' is lined up with pivot holes at 251 and the rod 254 is put through the hole at 251 on the near side, through the tube welded to the chute 36' and through the hole at 251 on the far side. A cotter pin or the like (not shown) is used to keep the rod from coming out. In this way, the discharge chute 36' is supported at one end.

FIGURE 22 shows its other end supported by the rod device 244 connected to the door bracket 245. Yoke 24' and discharge chute 36' do not turn with the machine. As the machine is lowered because of removal of silage material, the discharge chute 36' has to pivot where it is connected to the machine because its other end is fixed to the silo door frame. The dotted lines show the position this chute 36' gradually gets into because of the lowering of the machine in relation to the door opening.

A person moves the door end of chute 36' which would place the machine end back near its starting position again, when he lets the outer end down to a lower door opening. Then the above process would be repeated again until it was time to lower the outer end. The pivot end of the chute 36' does not get above conduit 125', yet the side towards the door gets some distance above it and makes the previously-referred-to triangular-shaped opening at the junction. In order to keep this opening closed at all times or positions of the chute 36', we place the referred-to flap 252 which pivots at 258 on a projection 255 welded to yoke 24'. This flap 252 has a triangular shape from a side view. It also has only three sides, as there is no direct connection between the right hand ends of the two triangular sides, as viewed in FIGURES 22 and 28.

All three sides of the flap 252 are smaller in dimensions than the chute 36', so that the latter can come completely over and enclose it. The notches 256 shown in the chute 36' near the pivot 258, allow the chute 36' to come down completely over the flap 252. Although the machine will work without the flap, it does prevent some material from getting out when the outside end of the chute 36' is in a raised position. Except as specifically disclosed, the third embodiment is to correspond with the first embodiment.

The Buschbom Patent No. 3,217,907, dated Nov. 16, 1965, discloses means for controlling a reversible winch motor so as to effect raising or lowering of the central part of a silo unloader, as desired. We propose, as an alternative to the hand-operated hoist 32 of FIGURE 4, to substitute a motor-driven winch 32' for said hoist and control the operation of the winch motor, for raising or lowering in accordance with the power input to the unloader motor.

To accomplish the stated purpose, we employ a reversible electric motor 198 connected to the winch 32' through suitable gearing 199 as shown in FIGURE 18. When driven in one direction, the winch 32' which is here shown secured to the outside of the silo 21 in place of the hoist 32, serves to wind up the cable 25 on its drum 201 and elevate the unloader 23 suspended thereby. When driven in the other direction, the drum 201 allows the cable 25 to unwind therefrom and the unloader to be lowered. The motor may be one of the A.C. type controlled through four wires by a reversal of the connections to two of them, as for the motor 54 of Patent No. 3,217,907, above referred to.

The motor 198, with a suitable starter, one suggested being designated 5-D, is here controlled by circuit means which, being familiar to those skilled in the art, is indicated without being described in full detail. FIGURES 19 and 20 illustrate an ammeter relay 202, which may be a D'Arsonval D.C. millivolt meter wired for A.C. operation, the movable element 204 of which carries a pointer 203 movable over a scale on a dial as the current in the element 204 varies. See brochure showing apparatus similar to that here employed and entitled "General Electric Water Relays, GEA-8014, ETR-2931, 6-65." The coil of said element 204 is connected to a power line of the unloader 23, here designated 146, as in FIGURE 14, by suitable means such as a shunt or transformer 205. Control, through the circuit of FIGURE 18, is effected by the operation of the motor 198 in one direction or the other, as the pointer 203 reaches low hand or setpointer 206 to effect unwinding of the cable 25, or the high hand or setpointer 207 to effect winding of the cable on the drum 201. When the pointer 203 is in the position illustrated, the coils of both of the normally open relays 208 and 209 of what may be a reversing contactor type 275 XXX (see Struthers-Drunn, Inc., Pitman, N.J., Prelim. data bull. 6275), are deenergized and the motor 198 does not run, even if its switch 211 is closed, because the power line 212 thereto is open.

The motor control apparatus of FIGURES 18, 19 and 20 may be operated as follows. It is first determined what are the electric current strengths for the minimum power and the maximum power that the drive motor 56 is to take. In the illustrated example, the pointer 206 is set for a minimum current input of about 60 ampers, irrespective of the votlage. The knob 213 serves to set the pointer or hand 206 and the knob 214 is for setting the pointer or hand 207.

However, if the motor 56 of the unloader uses 35 amperes to drive the machine when fully loaded, the pointer 203 will register this amount, or any amount of current drawn. With the pointer 203 at 35 amperes, the low set hand 206 is manually placed desirably near 35 amperes, say at 32 amperes. When the lead on the machine drops to 32 amperes or below, an electrical signal is sent, as with the use of a light-sensitive relay, which controls a reversing motor starter. This signal operates one side of the motor starter and causes the control motor 198 to run in one direction, which in this case lowers the unloader into more material, thus increasing the load on the motor until the pointer 203 registers above 32 amperes on the scale.

Once the low set hand 206 is placed where desired, the opeartor can leave the scene. Every time the pointer 203 falls on or below the set hand 206, the lowering machanism will operate until the load is increased to above its setting.

Another set hand 207 is desirably employed on the high side of the scale. With the pointer 203 again at 35 amperes, the high set hand 207 is placed at, say 45 amperes. The motor can stand some overload for short periods of time. If for some reason the load increases to 45 amperes or above, as because some frozen ensilage is engaged, another electrical signal is sent, as with the use of another light-sensitive relay, which controls the other side of the reversing motor starter. This causes the control motor 198 to be run in the opposite direction, which in this case will raise the machine 23 until the load drops the pointer 203 to below a reading 45 amperes.

In brief, when the motor load registered by the pointer 203 is between those represented by the two manually placed hands 206 and 207, no action of the control mechanism takes place. If the pointer 203 falls on or below the low set hand 206, the control mechanism lowers the unloader until the load increases. If the pointer 203 falls on or above the high set hand 207, the control mechanism raises the machine until the load decreases.

Specifically, as an example, if during the operation of the unloader 23, the level of the ensilage 30 on which it rests is so reduced that the power developed in the drive motor 56 drops so that the pointer 203 coincided or dropped below the low-set hand 206, a circuit is closed through the meter 202 as by the use of light-activated switches or "electric eyes" 210, controlled by lamp 220, FIGURE 20 (see the bottom diagram on page 7 of the General Electric brochure cited), to one of the relays, say that designated 208, through switch 211, line 212, meter binding post 213, intreior meter windings generally designated 214 and which may include said "electric eyes," return binding post 215 and return lead 216. This effects closure of the contacts of the triplex relay 208, allowing current to pass to and drive the motor 198 to turn the winch 32' to play out cable 25 from its drum 201, and lower the unloader 23 until the additional work involved in more closely engaging the ensilage 30 causes the pointer 203 to move up on its scale and break the actuating circuit to the relay 208, allowing the motor 198 to stop running.

Closure of the contacts of the relay 208 is effected by energizing the line 217 through interior meter windings 214 to binding post 218 from line 212, the return being through line 216. This means that leads 219 and 221 to motor 198 are then energized from power lead 212 while the other two leads 222 and 223 are connected to return lead 216.

On the other hand, if during unloader operation a hard spot in the ensilage is encountered, or for some other use of another "electric eye," like but additional to the pointer 203 coincides with or passes the high set hand 207, a circuit is closed through the meter 202 as with the use of another "electric eye," like but additional to the one shown on page 7 of the General Electric citation, as before, and effects closure of the contacts of the triplex relay 209. Such closure allows current to pass to and drive the motor 198 in the reverse direction to effect raising of the unloader 23 until the load thereon is reduced enough to cause the pointer 203 to move down on the scale to a point below the hand 207. This breaks the circuit through the relay 209 and causes the motor 198 to stop running.

Closure of the contacts of the relay 209 is effected by energizing the line 200 through interior meter windings 214 to binding post 225 from line 212, the return being through line 216. Here, as before, the leads 219 and 223 are respectively energized from the leads 212 and 216. However, the energization of the leads 221 and 222 is reversed, the former being energized from the lead 216 and the latter from the lead 212, so that operation of the motor 198 is reversed, as in the case of the motor 54 of the referred-to Patent No. 3,217,907.

From the foregoing, it will be seen that we have provided a silo unloader in which there is a first part which pulls ensilage from the outer periphery toward the center, while it rotates around the interior of the silo. Said ensilage is then picked up by a second part which blows it up to a third, or discharge part which conveys it to the outside of the silo. Power is supplied from the outside through slip ring means to a main motor 56, which drives the digger chain and the blower, a control motor 94 which effects the proper leveling of the machine, and a conveyor motor 164 or 164' which effects a final discharge of the ensilage from the silo, if not discharged from silo by the blower.

Having now described our invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention.

It will be understood that the word "silo" is here used in the broad sense to include enclosures for material other than green fodder.

We claim:

1. A silo unloader adapted to be positioned on the surface of ensilage within a silo, comprising an endless sprocket digger chain, inner and outer sprocket wheels respectively fixed on generally horizontal drive and driven shafts and over which said chain passes, a series of paddles carried by said chain, which during their bottom flight dig into ensilage on which supported and carry it toward the center of the silo, power means connected to said drive shaft for driving the inner of said sprocket wheels, drive wheels fixed to carrying shafts to support the outer end of said unloader and the chain for rotation about said sprocket wheels, and means comprising gearing from the driven shaft to the drive-wheel-carrying shafts to cause said drive wheels to turn and move the outer end of the unloader and the digger chain in a circle about the inside of the silo.

2. A silo unloader as recited in claim 1, wherein there is an ensilage cutter mounted to turn about an axis generally perpendicular to the vertical plane of the digger chain, driven from said outer sprocket wheel, so as to cut beyond and below the reach of the digger chain, remove the bank of ensilage, even if frozen, left at the wall of the silo and start it toward the digger chain for transfer toward the silo center.

3. A silo unloader as recited in claim 1, wherein the chain is guided between its sprocket wheels by a slide board under its upper flight and a hold-down board over its lower flight, a slide thrust portion being provided on said hold-down board, whereby said chain is kept from sagging between the wheels, forced to dig into the engaged ensilage, and kept from circumferential deviation as it is rotated.

4. A silo unloader as recited in claim 1, wherein the two ends of the driven shaft are extended, the means to cause the drive wheels to turn comprises universal joint assemblies secured to each end of the said driven shaft, a gear connected to the shaft of each drive wheel, and the other ends of said assemblies are operatively connected to said drive wheel shaft gears to impart motion to said drive wheels during operation of said unloader.

5. A silo unloader as recited in claim 1, wherein means are provided for transferring the weight of the outside end of the frame to the drive wheels as desired, comprising members connecting said wheels to said unloader frame, including horizontal pivot means between said members and frame, arms extending up from said members, a powered linear actuator between said arms, with its ends respectively connected thereto, and means comprising mercury switches on said frame in the circuit to said actuator, whereby when the frame tilts one way, the actuator lengthens and lifts the outer end thereof by pressure applied through said connecting members to the wheel axles, and when the frame tilts the other way, a reverse action occurs, whereby said frame is maintained in a generally horizontal position.

6. A silo unloader as recited in claim 1, wherein there is a centrifugal fan for transporting ensilage, deposited by said chain near the center of said silo, up through a conduit for eventual discharge from said silo, a housing for said fan provided with an aperture to receive such ensilage, an upwardly opening conduit for ensilage discharge, means for adjustably supporting said conduit comprising a hanger with depending arms supporting a thrust plate and non-rotatable electrical contact means, rotatable electrical contact means engaging said non-rotatable contact means, and a series of rotatably supported rollers encircling said conduit, said rollers engaging the top surface of said thrust plate to support said fan and housing, while allowing turning thereof about a vertical axis.

7. A silo unloader as recited in claim 1, comprising a winch on the outside of said silo, with a winding drum driven by a reversible electric motor, a cable connected to said unloader near said drive shaft and passing up over a pulley, diagonally down over another pulley outside of said silo to said drum, and means controlled by the magnitude of electric current to said power means, so that said reversible motor runs in one direction to lower the unloader if said current is less than a predetermined amount, and runs in the opposite direction to raise the unloader if said current is greater than a set amount, while not running when the current is between said amounts, whereby the power means is protected from overloads, while being allowed to carry as great a load as permissible, for efficient operation.

8. A silo unloader adapted to be positioned on the surface of ensilage within a silo, comprising a centrifugal fan for transporting ensilage deposited near the center of said silo, up through a conduit for eventual discharge from said silo, a housing for said fan provided with an aperture to receive such ensilage, an upwardly opening conduit for ensilage discharge, means for adjustably supporting said conduit comprising a hanger with depending arms supporting a thrust plate and nonrotatable electrical contact means, rotatable electrical contact means engaging said non-rotatable contact means, and a series of rotatably supported rollers encircling said conduit, said rollers engaging the top surface of said thrust plate to support said fan and housing, while allowing turning thereof about a vertical axis.

9. A silo unloader as recited in claim 8, wherein there is a conduit with a portion supported between said depending arms and into which is telescoped means to feed ensilage thereto, said conduit including a curved part telescoped with respect to said supported portion and pivoted to arms extending laterally from said hanger, and a conveyor device comprising an inner generally straight portion telescoping with respect to the upper portion of said curved part, an outer generally straight portion telescopically receiving the outer end portion of said inner portion, said inner portion being open at its lower side except for a wall partially closing said side at the end portion which is received in said outer portion, and a chain conveyor operable in said outer portion to move ensilage along said wall closing the lower side of said inner portion toward the outer end of said portion.

10. A silo unloader adapted to be positioned on the surface of ensilage within a silo, comprising a hanger with depending arms, a conduit with a portion supported between said arms and into which is telescoped means to feed ensilage thereto, said conduit including a part telescoped with respect to said supported portion and pivoted to arms extending laterally from said hanger, and a conveyor device comprising an inner portion connected to the upper portion of said telescoped part, an outer generally straight portion for receiving ensilage from the outer end portion of said inner portion, said inner portion being open at its lower side except for a wall partially closing said side, and a conveyor operable in said outer portion to move ensilage therealong toward the outer end thereof.

11. A silo unloader adapted to be positioned on the surface of ensilage within a silo, comprising a hanger with depending and laterally extending arms, a conduit with a portion supported between said arms and into which is telescoped means to feed ensilage thereto, said conduit including a part telescoped with respect to said supported portion and pivoted to said laterally extending arms, and a flap disposed inside the arm-supported portion of the conduit and pivoted so as to close an opening formed when the outer end of said conduit is raised relative to said arm-supported portion.

12. A silo unloader adapted to be positioned on the surface of ensilage within a silo, comprising a hanger with depending arms, arms extending laterally therefrom, a conduit with a portion supported between said arms and into which is telescoped means to feed ensilage thereto, said conduit including a part telescoped with respect to said supported portion and pivoted to said laterally extending arms and a supporting device comprising a rod device the outer end of which is pivoted to a bracket secured to the silo wall, inner and outer brackets depending from the outer portion of said conduit, a flanged wheel pivoted to the outer bracket and supportedly engaging the top of said rod device, and a flanged wheel pivoted to the inner bracket and supportingly engaging the bottom of said rod device.

13. A silo unloader adapted to be positioned on the surface of ensilage within a silo, comprising an endless digger chain, inner and outer wheels respectively fixed on generally horizontal drive and driven shafts and around which the chain travels, and a centrifugal fan involving paddles in a housing opening toward the lower elements of said chain, mounted on a shaft disposed generaly parallel to said chain wheel shafts and positioned adjacent and slightly above said drive shaft, to be near the center of the silo directly in line with, and having the lower ends of said paddles to move away from the ensilage deposited by said chain near the center of said silo, so that said ensilage is transported by said blower, without having to be turned through a sharp angle, up by and from said fan for eventual discharge from said silo.

14. A silo unloader as recited in claim 13, wherein there is a relatively-small-diameter impeller, as an intermediate ensilage mover, disposed below the fan and directly in line with the digger chain for increasing the speed of ensilage movement prior to its being picked up by said fan.

15. A silo unloader adapted to be positioned on the surface of ensilage within a silo comprising means for gathering ensilage and moving it toward the center of the silo and an upwardly opening conduit for discharge of said gathered ensilage from said unloader, means for adjustably supporting said conduit comprising a hanger with depending arms supporting a thrust plate and non-rotatable electrical contact means, rotatable electrical contact means engaging said non-rotatable contact means, and a series of rotatably supported rollers carried by and encircling said conduit, said rollers engaging the top surface of said thrust plate to support said conduit, while allowing turning thereof about a vertical axis.

16. A silo unloader comprising an electric drive motor therefor, a winch on the outside of said silo, with a winding drum driven by a reversible electric winch motor, a cable connected to said unloader near said drive shaft and passing up over a pulley, down over another pulley outside of said silo to said drum, and means including an ammeter with a pointer and connected to the drive motor power circuit to show the current drawn thereby, a hand of said ammeter settable at a position below and one settable at a position above the reading of said pointer when the drive motor is under normal load, and electric eyes for establishing a circuit to drive the winch motor in one direction or the other when said pointer reaches the set position of either hand, so that said winch motor runs in one direction to lower the unloader if said current is less than normal, and in the opposite direction to raise the unloader if said current is greater than normal, while not running when the current is between the amounts shown by said hand settings, whereby the drive motor is protected from overloads, while allowed to carry as great a load as permissible, for efficient operation.

17. A material-handling device adapted to be positioned on the surface of material in an enclosure comprising, means carried thereby for moving said material toward the center of the enclosure, a centrifugal fan positioned adjacent the inner end of said moving means to be near the center of the enclosure directly in line with, for transporting ensilage gathered by, said moving means at that place, up from said fan for eventual discharge from said enclosure, and means for staging the movement of material between said moving means and fan comprising, a relatively small-diameter impeller, as an intermediate material mover, disposed below the fan directly in line with said moving means for increasing the speed of material movement prior to its being picked up by said fan.

18. An adjustable frame for material-handling device comprising a yoke provided with an arm projecting in one direction and bifurcations projecting in the opposite direction, a driven sprocket wheel pivoted between said bifurcations, a hollow longitudinally-slotted frame portion, in which said arm fits, lying along the axis of said yoke, a drive sprocket wheel pivoted with respect thereto, a material-handling chain passing around said sprocket wheels, bosses outstanding on each side of said hollow frame portion, a bolt threaded into each boss, and ears outstanding from opposite sides of said yoke and engageable by said bolts, whereby upon turning said bolts so that heads thereof press against said ears, the frame may be lengthened to tighten the chain, and means to squeeze the slotted portions of said frame into tight engagement with said arm after a desired tightening of said chain.

19. A silo unloader adapted to be positioned on the surface of ensilage within a silo, comprising an endless sprocket digger chain, inner and outer sprocket wheels respectively fixed on generally horizontal drive and driven shafts and over which said chain passes, a series of paddles carried by said chain, which during their bottom flight dig into ensilage on which supported and carry it toward the center of the silo, power means connected to said drive shaft for driving the inner of said sprocket wheels, wherein there is an ensilage cutter mounted outwardly of the digger chain and driven about an axis generally perpendicular to the vertical plane of the digger chain, so as to cut beyond and below the reach of the digger chain and remove the bank of ensilage, even if frozen, left at the wall of the silo and start it toward the center of the silo.

20. A silo unloader adapted to be positioned on the surface of ensilage within a silo having a generally vertical axis and an aperture in a side, comprising in combination, first means traveling radially while being rotated about the silo axis, including an endless sprocket digger chain, inner and outer sprocket wheels respectively fixed on drive and driven shafts and over which said chain passes, a series of paddles carried by said chain, which during their bottom flight dig into ensilage on which supported and carry it toward the axis of the silo, an electric motor connected to said drive shaft for powering said first means by driving the inner of said sprocket wheels, the means for rotating said first means comprising drive wheels fixed to carrying shafts to support the outer end of said unloader and the chain for rotation about said sprocket wheels, and gearing from the driven shaft to the drive-wheel-carrying shafts to cause said drive wheels to be driven from the motor only indirectly through said drive shaft, chain, sprocket wheels, driven shaft and gearing, and move the outer end of the unloader and the digger chain in a circle about the inside of the silo, second means for elevating ensilage from that fed toward said axis, and third means for receiving said elevated ensilage and discharging it laterally from the silo, including a conduit for conducting ensilage from the top of said second means into the lower end of the third means, said conduit telescoping over the top end portion of said second means and vertically swingable with respect thereto.

21. A silo unloader adapted to be positioned on the surface of ensilage within a silo having a generally vertical axis and an aperture in a side, comprising in combination, first means, including an electric power drive, traveling radially, while being rotated about the silo axis, for feeding ensilage toward said axis, second means for elevating ensilage from that fed toward said axis, comprising a centrifugal fan for transporting ensilage deposited near the axis of said silo, up through a conduit for eventual discharge from said silo, a housing for said fan provided with an aperture facing downward and outward to receive ensilage drawn thereinto by said fan, an upwardly opening conduit for ensilage discharge, means for adjustably supporting said conduit comprising a hanger with depending arms supporting a thrust plate and non-rotating electrical contact means, rotatable electrical contact means engaging said non-rotating contact means, and a series of rotatably supported rollers encircling said conduit, said rollers engaging the top surface of said thrust plate to support said fan and housing, while allowing turning thereof about a vertical axis, and third means for receiving said elevated ensilage and discharging it laterally from the silo, including a conduit for conducting ensilage from the top of said second means into the lower end of the third means, said conduit telescoping over the top end portion of said second means and vertically swingable with respect thereto.

22. A silo unloader adapted to be positioned on the surface of ensilage within a silo having a generally vertical axis and an aperture in a side, comprising in combination, first means, including an electric power drive, traveling radially, while being rotated about the silo axis, for feeding ensilage toward said axis, second means for elevating ensilage from that fed toward said axis, and third means for receiving said elevated ensilage and discharging it laterally from the silo, including a conduit for conducting ensilage from the top of said second means into the lower end of the third means, said conduit telescoping over the top end portion of said second means and vertically swingable with respect thereto, said third means comprising a hanger with depending arms, a conduit with a portion supported between said arms and into which is telescoped means to feed ensilage thereto, said conduit including a part telescoped with respect to said supported portion and pivoted to arms extending laterally from said hanger, and a conveyor device comprising an inner portion connected to the upper portion of said telescoped part, an outer generally straight portion for receiving ensilage from the outer end portion of said inner portion, said inner portion being open at its lower side except for a wall partially closing said side, and a conveyor operable in said outer portion to move ensilage therealong toward the outer end thereof.

23. A silo unloader adapted to be positioned on the surface of ensilage within a silo having a generally vertical axis and an aperture in a side, comprising in combination, first means, including an electric power drive traveling radially, while being rotated about the silo axis, for feeding ensilage toward said axis, second means for elevating ensilage from that fed toward said axis, third means for receiving said elevated ensilage and discharging it laterally from the silo, including a conduit for conducting ensilage from the top of said second means into the lower end of the third means, said conduit telescoping over the top end portion of said second means and vertically swingable with respect thereto, a winch on the outside of said silo, with a winding drum driven by a reversible electric motor, a cable connected to said second means and passing up over a pulley, diagonally down over another pulley outside of said silo to said drum, and means controlled by the magnitude of electric current to said power means, so that said reversible motor runs in one direction to lower the second means if said current is less than a predetermined amount, and runs in the opposite direction to raise the second means if said current is greater than a set amount, while not running when the current is between said amounts, whereby the power means is protected from overloads, while being allowed to carry as great a load as permissible, for efficient operation.

References Cited

UNITED STATES PATENTS

| | | |
|---|---|---|
| 2,794,560 | 6/1957 | Buschbom. |
| 2,978,121 | 4/1961 | Chapman. |
| 3,002,790 | 10/1961 | Chapman. |
| 3,013,674 | 12/1961 | Patz et al. |
| 3,017,043 | 1/1962 | Buschbom. |
| 3,095,985 | 6/1963 | Buschbom. |
| 3,144,143 | 8/1964 | Wilkes. |
| 3,175,668 | 3/1965 | Stoltzfus. |
| 3,239,279 | 3/1966 | Skromme et al. |
| 3,308,973 | 3/1967 | Heitzman. |

ROBERT G. SHERIDAN, Primary Examiner

U.S. Cl. X.R.

198—208; 214—17